United States Patent
Kaizu et al.

(10) Patent No.: US 9,640,205 B1
(45) Date of Patent: May 2, 2017

(54) MAGNETIC RECORDING-REPRODUCING HEAD HAVING DIFFERENT SECTIONS WITH DIFFERENT FUNCTIONS INCLUDING AN ERASE FUNCTION

(71) Applicant: TDK CORPORATION, Tokyo (JP)

(72) Inventors: Akimasa Kaizu, Tokyo (JP); Kei Hirata, Tokyo (JP); Yosuke Antoku, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/066,510

(22) Filed: Mar. 10, 2016

(51) Int. Cl.
*G11B 5/024* (2006.01)
*G11B 5/39* (2006.01)
*G11B 5/60* (2006.01)
*G11B 5/265* (2006.01)

(52) U.S. Cl.
CPC ............ *G11B 5/3945* (2013.01); *G11B 5/024* (2013.01); *G11B 5/265* (2013.01); *G11B 5/6082* (2013.01)

(58) Field of Classification Search
CPC .................................. G11B 5/024; G11B 5/265
USPC .................................................. 360/118, 121
See application file for complete search history.

(56) References Cited

U.S. PATENT DOCUMENTS

| | | | | |
|---|---|---|---|---|
| 5,138,508 A | * | 8/1992 | Matsuzawa | G11B 5/1871 29/603.18 |
| 6,128,166 A | * | 10/2000 | Tanaka | G11B 5/012 360/317 |
| 6,795,277 B2 | * | 9/2004 | Tsuchiya | G11B 5/1278 360/317 |
| 6,801,379 B2 | | 10/2004 | Ozue et al. | |
| 7,256,962 B2 | * | 8/2007 | Tateishi | G11B 5/2657 360/118 |
| 7,394,619 B2 | * | 7/2008 | Nikitin | B82Y 10/00 360/118 |
| 8,665,548 B2 | | 3/2014 | Hirata et al. | |
| 9,099,103 B1 | | 8/2015 | Krichevsky | |
| 2004/0257711 A1 | * | 12/2004 | Ushiyama | B82Y 10/00 360/317 |
| 2005/0122620 A1 | * | 6/2005 | Suda | G11B 5/00817 360/121 |
| 2006/0114605 A1 | * | 6/2006 | Nikitin | B82Y 10/00 360/118 |

FOREIGN PATENT DOCUMENTS

| | | |
|---|---|---|
| JP | S64-42504 U | 3/1989 |
| JP | 2000-149231 A | 5/2000 |
| JP | 2002-216313 A | 8/2002 |
| JP | 2015-103261 A | 6/2015 |

* cited by examiner

*Primary Examiner* — Jefferson Evans
(74) *Attorney, Agent, or Firm* — Oliff PLC

(57) ABSTRACT

A magnetic recording-reproducing head includes, on a support member, a first head section having a function of executing a recording process and having a function of executing a reproducing process, and one or more second head sections each having a function of executing an erasing process and having no function of executing a reproducing process.

9 Claims, 11 Drawing Sheets

MAGNETIC RECORDING-REPRODUCING HEAD HAVING DIFFERENT SECTIONS WITH DIFFERENT FUNCTIONS INCLUDING AN ERASE FUNCTION

BACKGROUND OF THE INVENTION

1. Technical Field of the Invention

The invention relates to a magnetic recording-reproducing head allowing for execution of both a recording process and a reproducing process, and to a magnetic recording-reproducing unit using the magnetic recording-reproducing head.

2. Description of Related Art

In recent years, a magnetic recording-reproducing unit has been used to execute a recording process and a reproducing process for a magnetic recording medium such as a hard disk. This magnetic recording-reproducing unit is equipped with a magnetic recording-reproducing head allowing for execution of both a recording process and a reproducing process.

Various proposals have been made to improve performance of the magnetic recording-reproducing head. Specifically, to improve recording and reproducing characteristics, a magnetic head for recording and reproducing and a magnetic head for erasing are used together (for example, see Japanese Unexamined Utility Model Application Publication No. S64-042504). The magnetic head for recording and reproducing allows for switching between a recording function and a reproducing function, and the magnetic head for erasing allows for switching between an erasing function and a reproducing function.

However, the recording and reproducing characteristics of the magnetic recording-reproducing head may be still insufficient and therefore, there is room for improvement.

Accordingly, a technology for obtaining excellent recording and reproducing characteristics is expected.

SUMMARY OF THE INVENTION

A magnetic recording-reproducing head of an embodiment of the invention includes, on a support member, a first head section having a function of executing a recording process and having a function of executing a reproducing process, and one or more second head sections each having a function of executing an erasing process and having no function of executing a reproducing process.

Further, a magnetic recording-reproducing unit of an embodiment of the invention includes a magnetic recording medium, and a magnetic recording-reproducing head, and the magnetic recording-reproducing head has a configuration similar to a configuration of the above-described magnetic recording-reproducing head of the invention.

According to the magnetic recording-reproducing head of the embodiment of the invention and the magnetic recording-reproducing unit of the embodiment of the invention, the first head section and the second head section are provided on the support member. The first head section has the function of executing the recording process and has the function of executing the reproducing process, whereas the one or more second head sections each have the function of executing the erasing process and have no function of executing the reproducing process. Therefore, excellent recording and reproducing characteristics are obtainable.

DETAILED DESCRIPTION OF PREFERRED EMBODIMENTS

Some embodiments of the invention will be described below in detail with reference to the drawings. It is to be noted that the description will be provided in the following order.

1. Magnetic Recording-Reproducing Head
  1-1. First Embodiment (Horizontal Disposition Type Configuration)
    1-1-1. Overall Configuration
    1-1-2. Configuration of First Head Section
    1-1-3. Configuration of Second Head Section
    1-1-4. Operation
    1-1-5. Action and Effect
  1-2. Second Embodiment (Vertical Disposition Type Configuration).
    1-2-1. Configuration
    1-2-2. Operation
    1-2-3. Action and Effect
  1-3. Modifications
2. Magnetic Recording-Reproducing Unit <1. Magnetic Recording-Reproducing Head>

First, a magnetic recording-reproducing head of an embodiment of the invention will be described.

1-1. FIRST EMBODIMENT

Horizontal Disposition Type Configuration

A magnetic recording-reproducing head of a first embodiment has a so-called horizontal disposition type configuration. This "horizontal disposition type configuration" represents a configuration determined based on a positional relationship between a first head section 50 and a second head section 70 to be described later, and details of the horizontal disposition type configuration will be described later.

<1-1-1. Overall Configuration>

Figure 1:
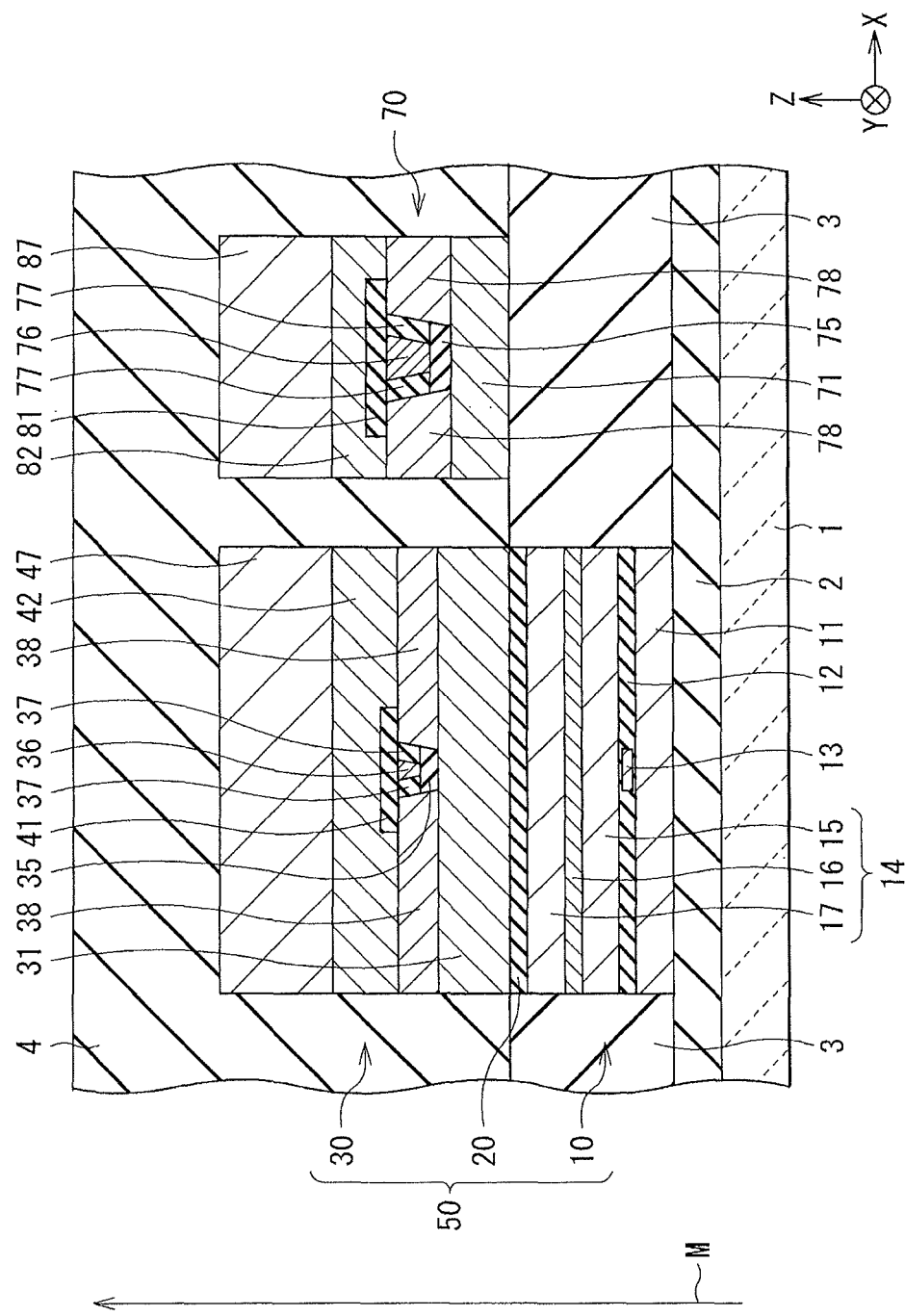
FIG. 1 is a cross-sectional diagram illustrating a configuration (a XZ cross section) of a magnetic recording-reproducing head in a first embodiment of the invention.
Figure 2:
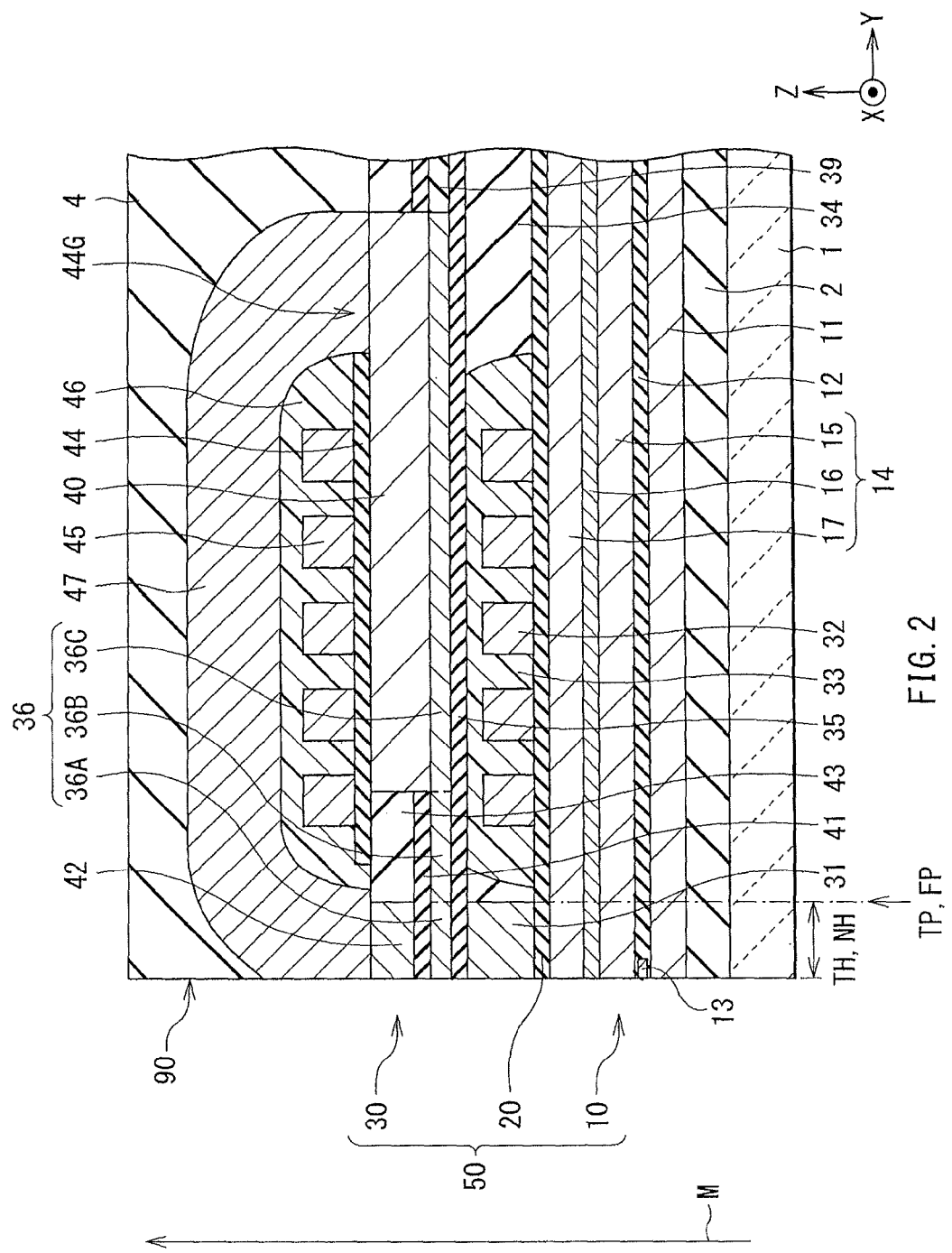
FIG. 2 is a cross-sectional diagram illustrating a configuration (a YZ cross section) of a first head section.
Figure 3:
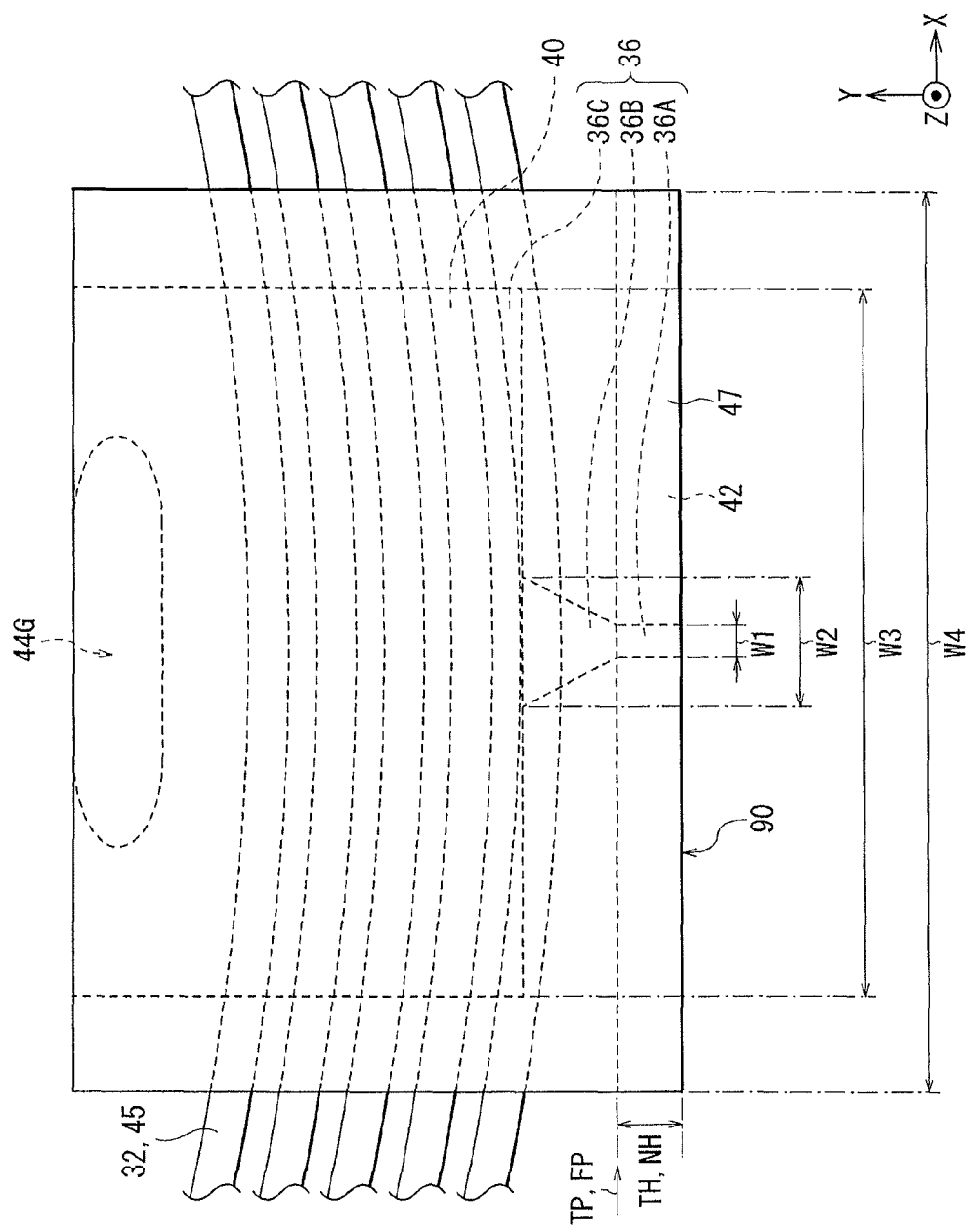
FIG. 3 is a plan view illustrating a configuration (an XY plane) of a main part of the first head section.
Figure 4:
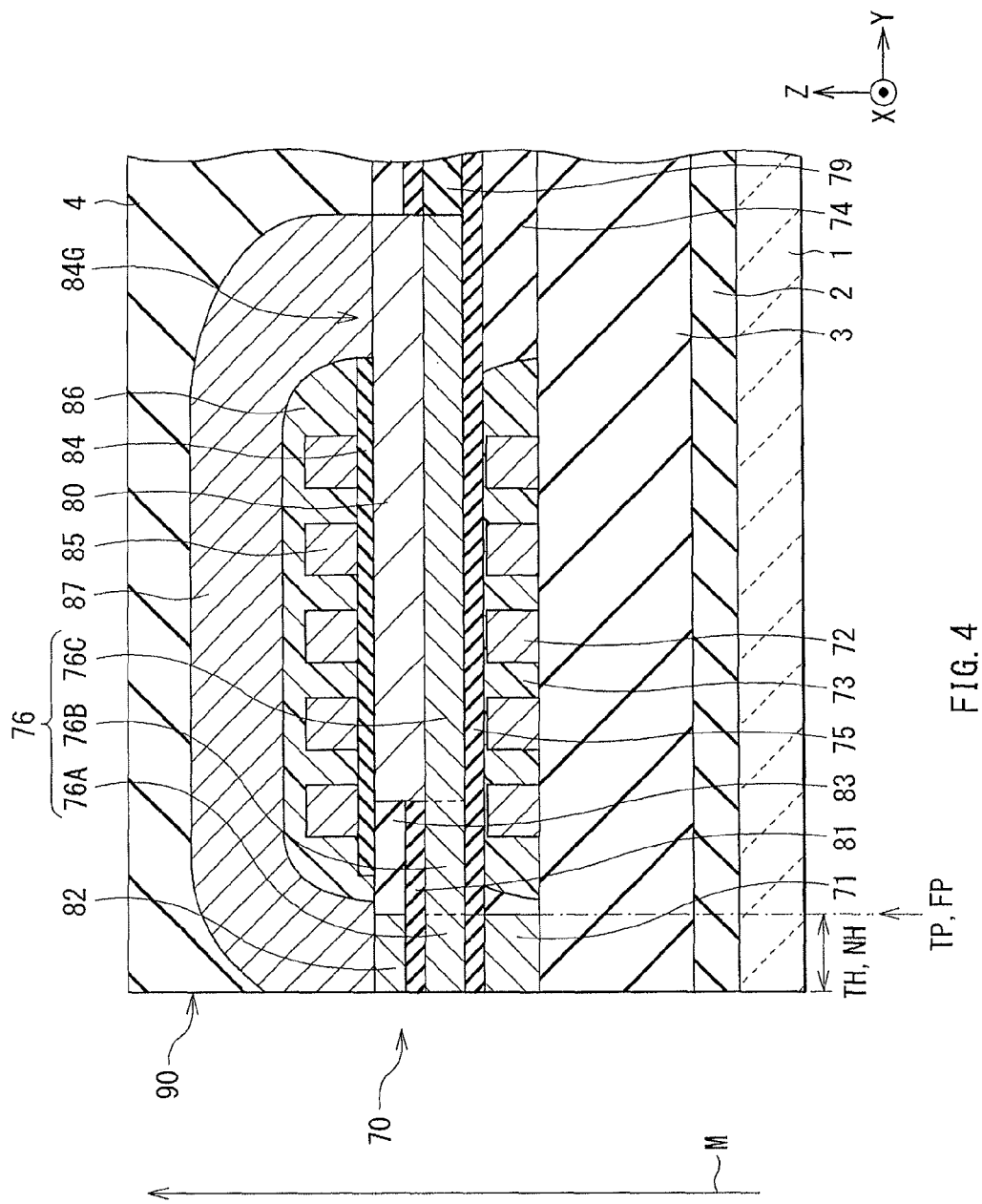
FIG. 4 is a cross-sectional diagram illustrating a configuration (a YZ cross section) of a second head section.
Figure 5:
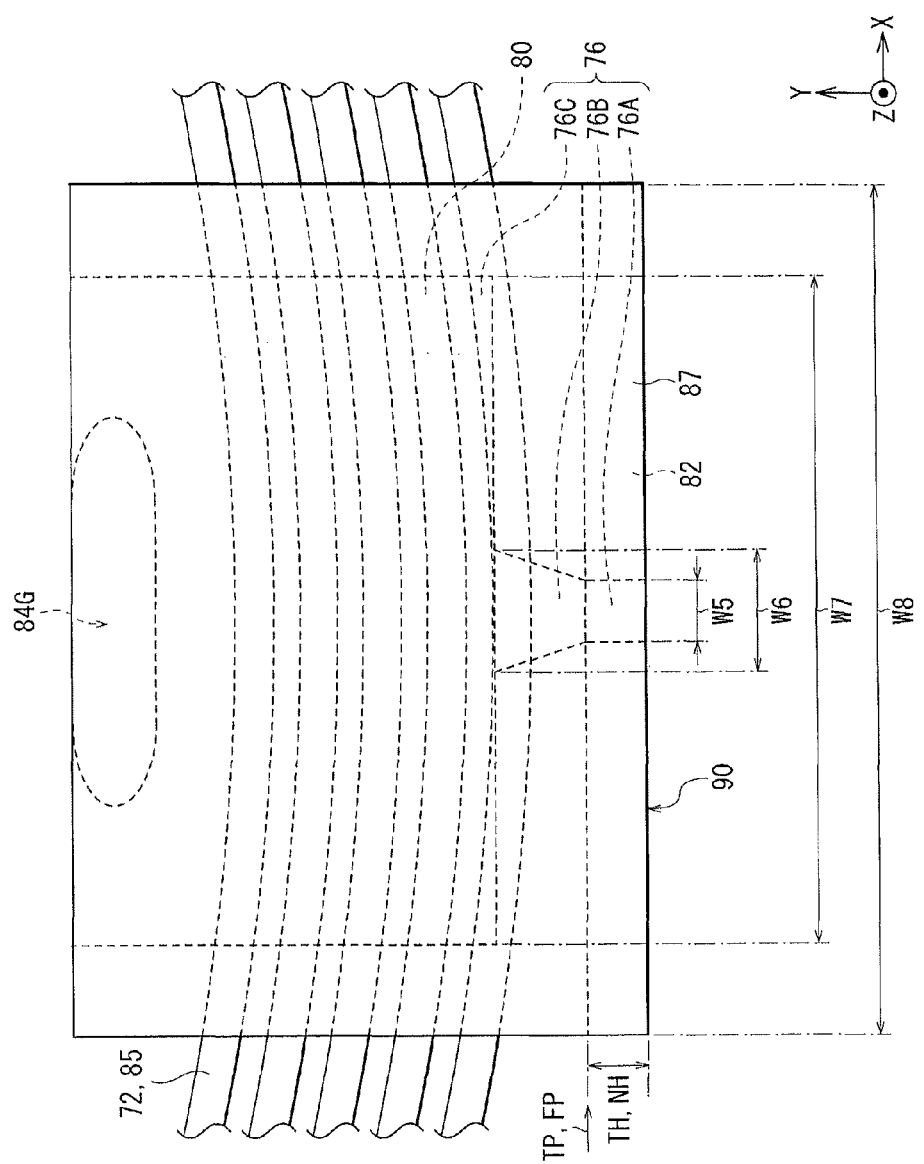
FIG. 5 is a plan view illustrating a configuration (an XY plane) of a main part of the second head section.
Figure 6:
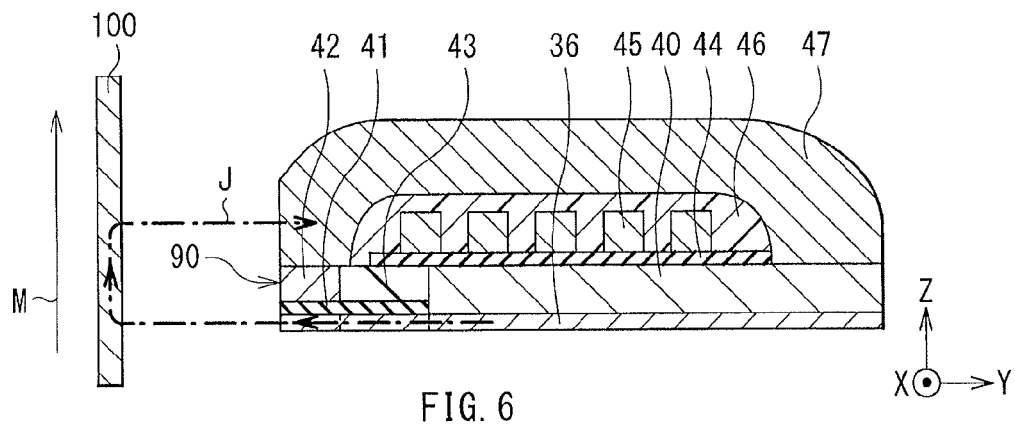
FIG. 6 is a cross-sectional diagram for description of a relationship (a YZ plane) between the magnetic recording-reproducing head and a magnetic recording medium.
Figure 7:
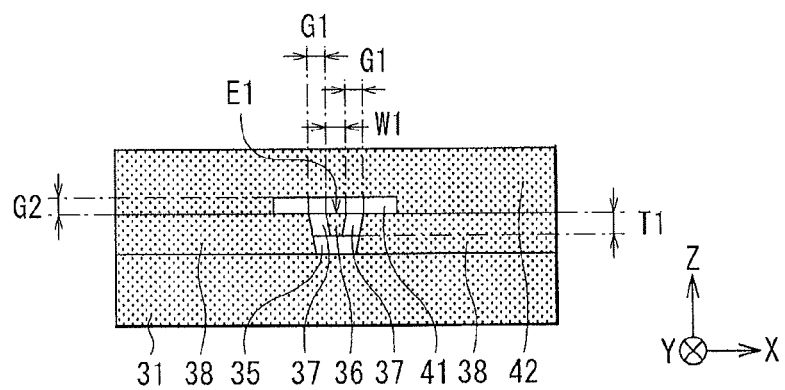
FIG. 7 is a plan view illustrating a configuration (an XZ plane) of the main part of the first head section on an air bearing surface.
Figure 8:
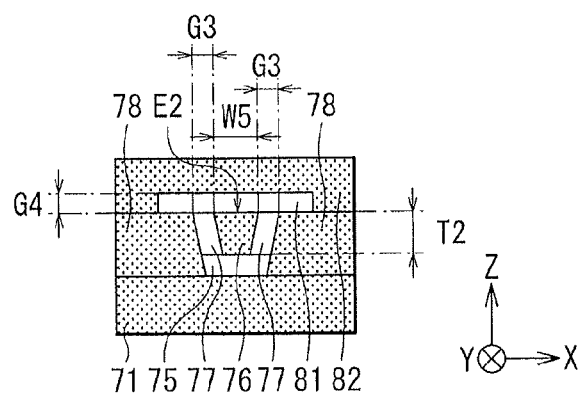
FIG. 8 is a plan view illustrating a configuration (an XZ plane) of the main part of the second head section on the air bearing surface.

FIG. 1 to FIG. 8 each illustrate a configuration of the magnetic recording-reproducing head of the first embodiment. Specifically, FIG. 1 illustrates a cross-sectional configuration of the magnetic recording-reproducing head. FIG. 2 illustrates a cross-sectional configuration of the first head section 50, and FIG. 3 illustrates a plane configuration of a main part of the first head section 50. FIG. 4 illustrates a cross-sectional configuration of the second head section 70, and FIG. 5 illustrates a plane configuration of a main part of the second head section 70. FIG. 6 illustrates a relationship between the magnetic recording-reproducing head and a magnetic recording medium 100. FIG. 7 illustrates a plane configuration of the main part of the first head section 50 on an air bearing surface 90. FIG. 8 illustrates a plane configuration of the main part of the second head section 70 on the air bearing surface 90.

It is to be noted that FIG. 1 illustrates a cross section (a XZ cross section) parallel to the air bearing surface 90. FIG. 2 and FIG. 4 each illustrate a cross section (a YZ cross section) perpendicular to the air bearing surface 90. FIG. 3 and FIG. 5 each illustrate a plane (an XY plane) viewed from a Z direction. FIG. 6 illustrates a cross section (a YZ plane) of the main part of the first head section 50 illustrated in FIG. 2, and also illustrates a cross section (a YZ plane) of the magnetic recording medium 100. FIG. 7 illustrates a plane (an XZ plane) of the main part of the first head section 50 viewed from a Y direction, and FIG. 8 illustrates a plane (an XZ plane) of the main part of the second head section 70 viewed from the Y direction.

An upward arrow M illustrated in each of FIG. 1, FIG. 2, FIG. 4, and FIG. 6 represents a direction in which the magnetic recording medium 100 moves relative to the magnetic recording-reproducing head, namely, a movement direction of the magnetic recording medium 100.

In the following description, dimensions, directions, etc. are defined as follows. A dimension in an X direction is "width", a dimension in the Y direction is "length", and a dimension in the Z direction is "thickness". In the Y direction, a side close to the air bearing surface 90 is "front", and a side away from the air bearing surface 90 is "back". In the movement direction (the direction indicated by the arrow M) of the magnetic recording medium 100, a forward side (a side away from a substrate 1) is "trailing side", and a backward side (a side close to the substrate 1) is "leading side". The X direction is "cross track direction" (a recording track width direction), and the Y direction is "down track direction" (a direction intersecting the recording track width direction).

The magnetic recording-reproducing head described here is an element that performs a magnetic process on the magnetic recording medium 100 such as a hard disk, and more specifically, a composite head allowing for execution of both a recording process and a reproducing process.

For example, as illustrated in FIG. 1, FIG. 2, FIG. 4, and FIG. 6, the magnetic recording-reproducing head includes, on the substrate 1, an insulating layer 2, the first head section 50, the one or more second head sections 70, an insulating layer 3, and an overcoat layer 4. This magnetic recording-reproducing head has a surface (the air bearing surface 90) that faces the magnetic recording medium 100.

It is to be noted that each of functions and formation materials pertaining to a series of components of the magnetic recording-reproducing head to be described below is only an example.

The substrate 1 is a support member that supports the first head section 50 and the second head section 70, and contains, for example, a ceramic material such as AlTiC ($Al_2O_3$—TiC).

The insulating layer 2 is formed on the substrate 1. The insulating layer 2 contains a nonmagnetic insulating material such as aluminum oxide ($AlO_x$). Examples of the aluminum oxide include alumina ($Al_2O_3$).

The first head section 50 is formed on the insulating layer 2. The first head section 50 has a function of executing the recording process, and has a function of executing the reproducing process. Accordingly, the first head section 50 includes a reproducing section 10 that executes the reproducing process, and a recording section 30 that executes the recording process. It is to be noted that the configuration and functions of the first head section 50 will be described in detail later.

The second head section 70 is formed on the insulating layer 3. The second head section 70 has a function of executing an erasing process, and has no function of executing a reproducing process. It is to be noted that the configuration and functions of the second head section 70 will be described in detail later.

The insulating layer 3 is mainly embedded around the reproducing section 10. The insulating layer 3 contains, for example, a nonmagnetic insulating material similar to the material of the insulating layer 2.

The overcoat layer 4 is mainly embedded around each of the first head section 50 and the second head section 70 to cover these sections. The overcoat layer 4 contains, for example, a nonmagnetic insulating material similar to the material of the insulating layer 3.

It is to be noted that, as illustrated in FIG. 1, the first head section 50 and the second head section 70 described here are formed on the one substrate 1. In other words, the first head section 50 and the second head section 70 are included in a single magnetic head slider 202 (see FIG. 12 and FIG. 13) to be described later.

<1-1-2. Configuration of First Head Section>

To execute both the recording process and the reproducing process, the first head section 50 includes a main pole layer 36 that executes the recording process and a reproducing element (an MR element) 13 that executes the reproducing process.

To be more specific, for example, as illustrated in FIG. 1 to FIG. 3, the first head section 50 includes the reproducing section 10, a separation layer 20, and the recording section 30.

[Reproducing Section]

The reproducing section 10 is formed on the insulating layer 2, and provided to execute the reproducing process by utilizing a magneto-resistive effect (MR). This reproducing section 10 includes, for example, a lower read shield layer 11, a shield gap layer 12, the MR element 13, and the upper read shield layer 14.

The lower read shield layer 11 extends from the air bearing surface 90 toward the back, and magnetically separates the MR element 13 from its periphery. This lower read shield layer 11 contains, for example, a magnetic material such as a nickel-iron alloy (NiFe). Examples of the nickel-iron alloy may include Permalloy ($Ni_{80}Fe_{20}$: product name) containing 80 wt % of nickel and 20 wt % of iron.

The shield gap layer 12 is formed on the lower read shield layer 11, and provided to separate the MR element 13 electrically from its periphery. This shield gap layer 12 contains, for example, a nonmagnetic insulating material such as the alumina.

The MR element 13 is embedded in the shield gap layer 12 in such a manner that one end surface is exposed on the air bearing surface 90. This MR element 13 is, for example, a magneto-resistive effect element that executes the reproducing process by utilizing a giant magneto-resistive effect (GMR), a tunneling magneto-resistive effect (TMR), or any other similar effect.

The upper read shield layer 14 is formed on the shield gap layer 12. By extending from the air bearing surface 90 toward the back, the upper read shield layer 14 has a function similar to the function of the lower read shield layer 11. This upper read shield layer 14 is, for example, a multilayer. To be more specific, the upper read shield layer 14 includes two magnetic layers 15 and 17, and a nonmagnetic layer 16 inserted between the two magnetic layers 15 and 17. The magnetic layers 15 and 17 each contain, for example, a magnetic material such as Permalloy. The nonmagnetic layer 16 contains, for example, a nonmagnetic conductive material such as ruthenium (Ru) or a nonmagnetic insulating material such as the alumina. It is to be noted that the upper read shield layer 14 is not limited to the multilayer, and may be a single layer containing a magnetic material.

[Separation Layer]

The separation layer 20 is formed on the reproducing section 10, and provided to separate the reproducing section 10 magnetically from the recording section 30. This separation layer 20 contains, for example, a nonmagnetic insulating material similar to the material of the insulating layer 2.

[Recording Section]

The recording section 30 is formed on the separation layer 20, and provided to execute a recording process employing, for example, a perpendicular magnetic-recording scheme. This recording section 30 includes, for example, a leading shield 31, a thin-film coil 32 embedded by coil insulating layers 33 to 35, the main pole layer 36, a pair of gap layers 37, a pair of side shields 38 and an insulating layer 39, an auxiliary magnetic pole 40 and a gap layer 41, a trailing shield 42 and an insulating layer 43, a thin-film coil 45 embedded by coil insulating layers 44 and 46, and a return yoke 47.

Mainly, by taking a part of a magnetic flux concentrated in the main pole layer 36 (a front-end portion 36A to be described later) in proximity to the air bearing surface 90, the leading shield 31 suppresses expansion of the magnetic flux in the down track direction (a leading side of the front-end portion 36A). This leading shield 31 contains, for example, a magnetic material similar to the material of the main pole layer 36.

Mainly, to suppress unintentional leakage of a recording magnetic flux generated in the thin-film coil 45 to the reproducing section 10, the thin-film coil 32 generates a magnetic flux for leakage suppression. This thin-film coil 32 contains, for example, a conductive material such as copper (Cu), and has a spiral configuration of winding around a back gap 44G. This back gap 44G is a space for connecting the auxiliary magnetic pole layer 40 and the return yoke 47. It is to be noted that a winding number (the number of turns) of the thin-film coil 32 is not limited in particular, but preferably, may match with the number of turns of the thin-film coil 45.

The coil insulating layers 33 to 35 electrically separate the thin-film coil 32 from its periphery. The coil insulating layer 33 is embedded in clearance between the windings of the thin-film coil 32, and provided to cover the windings. The coil insulating layer 33 contains, for example, a photoresist that flows at the time of heating or a nonmagnetic insulating material such as Spin On Glass (SOG). The coil insulating layer 34 is provided around the coil insulating layer 33, and the coil insulating layer 35 is provided to cover the thin-film coil 32 and the coil insulating layers 33 and 34. The coil insulating layers 34 and 35 each contain, for example, a nonmagnetic insulating material such as the alumina. It is to be noted that the coil insulating layer 35 also has a function of serving as a gap (a so-called leading gap) for magnetically separating the leading shield 31 from the main pole layer 36.

The main pole layer 36 is formed on the coil insulating layer 35, and provided to serve as a recording magnetic pole layer that executes the recording process. This main pole layer 36 generates a recording magnetic field, by releasing the recording magnetic flux generated in the thin-film coil 45 toward the magnetic recording medium 100. In addition, the main pole layer 36 extends from the air bearing surface 90 toward the back, and contains, for example, a high-saturation magnetic-flux-density magnetic material such as iron-based alloy. The iron-based alloy may include, for example, an iron-cobalt alloy (FeCo) or iron-cobalt-nickel alloy (FeCoNi) without limitation.

For example, as illustrated in FIG. 3, a planar shape of the main pole layer 36 has a battledore shape. This main pole layer 36 includes, for example, the front-end portion 36A having a constant width W1 defining a recording track width, an intermediate portion 36B having a width gradually increasing to a width W2 greater than the width W1, and a rear-end portion 36C having a constant width W3 greater than the width W2, in this order from the air bearing surface 90. The rear-end portion 36C has, for example, a planar shape in which the width W3 is greater than the length, and the planar shape of the rear-end portion 36C is, for example, an oblong rectangle. A position where the width of the main pole layer 36 begins to increase from the width W1 is a so-called flare point FP, and a distance (the length of the front-end portion 36A) between the air bearing surface 90 and the flare point FP is a so-called neck height NH.

A planar shape of an end face of the main pole layer 36 (the front-end portion 36A) on the air bearing surface 90 is, for example, an inverted trapezoid, as illustrated in FIG. 7. In other words, at the end face of the main pole layer 36, the width W1 of an edge (a trailing edge E1) on the trailing side is greater than a width of an edge (a leading edge) on the leading side. However, the shape of the end face is not limited to the inverted trapezoid, and may be other shape exemplified by an inverted triangle or rectangle. The two side-end edges (side edges) may each be a linear, or may each be a bend or curve. The trailing edge E1 is a substantial recording part of the main pole layer 36, and the width W1 of the trailing edge E1 is, for example, 0.2 µm or less.

The pair of gap layers 37 are formed on the coil insulating layer 35, and provided to serve as a gap (a so-called side gap) that magnetically separates the pair of side shields 38 from the main pole layer 36. The pair of gap layers 37 are provided on both sides of the main pole layer 36 in the cross track direction. The pair of gap layers 37 contain, for example, a nonmagnetic insulating material such as the alumina.

The pair of side shields 38 are formed on the coil insulating layer 35. Mainly, by taking a part of the magnetic flux concentrated in the front-end portion 36A in proximity to the air bearing surface 90, the pair of side shields 38 suppress expansion of the magnetic flux in the cross track direction. The pair of side shields 38 are provided on both sides of the main pole layer 36 (the front-end portion 36A) in the cross track direction, and separated from the main pole layer 36 with the pair of gap layers 37 interposed therebetween. In addition, the pair of side shields 38 each contain, for example, a magnetic material similar to the material of the main pole layer 36.

It is to be noted that, for example, as illustrated in FIG. 1, the coil insulating layer 35 is formed only at a position facing the main pole layer 36 and in proximity thereto. Therefore, the front-end portion 36A of the main pole layer 36 are separated from the pair of side shields 38, with the coil insulating layer 35 and the pair of gap layers 37 that are interposed therebetween. Further, the pair of side shields 38 are connected to, for example, the leading shield 31.

The insulating layer 39 is embedded around the main pole layer 36 and the pair of side shields 38, and provided to separate the main pole layer 36 and the pair of side shields 38 electrically from their periphery. This insulating layer 39 contains, for example, a nonmagnetic insulating material such as the alumina.

On the trailing side of the main pole layer 36, the auxiliary magnetic pole layer 40 is provided to extend from a position further backward than the air bearing surface 90 toward the back, and connected to the main pole layer 36. This auxiliary magnetic pole layer 40 is an auxiliary flux storage portion for supply of the main pole layer 36 with a magnetic flux, and contains, for example, a magnetic material similar to the material of the main pole layer 36.

A planar shape of the auxiliary magnetic pole layer 40 is, for example, a rectangle having the width W3, as illustrated in FIG. 3.

The gap layer 41 is formed on the main pole layer 36, and provided as a gap (a so-called trailing gap) that magnetically separates the trailing shield 42 from the main pole layer 36. For example, this gap layer 41 extends from the air bearing surface 90 toward the back while being adjacent to the main pole layer 36, and terminates at a front end of the auxiliary magnetic pole 40. Further, the gap layer 41 contains, for example, a nonmagnetic insulating material such as the alumina.

The insulating layer 43 is embedded around the auxiliary magnetic pole layer 40 and provided to define a throat height TH. In this insulating layer 43, a forefront end position of a part formed between the auxiliary magnetic pole layer 40 and the trailing shield 42 is a throat-height zero position TP, and a distance between the throat-height zero position TP and the air bearing surface 90 is the above-described throat height TH. This insulating layer 43 contains, for example, a nonmagnetic insulating material such as the alumina. It is to be noted that FIG. 3 illustrates, for example, a case where the throat-height zero position TP and the flare point FP match with each other. However, the throat-height zero position TP and the flare point FP may not match with each other.

The trailing shield 42 is a write shield that suppresses expansion of the magnetic flux in the down track direction (on the trailing side of the front-end portion 36A), mainly, by taking a part of the magnetic flux concentrated in the main pole layer 36 (the front-end portion 36A) in proximity to the air bearing surface 90. Since a magnetic field gradient of a perpendicular magnetic field in the down track direction increases by utilizing this function of the trailing shield 42, the recording track width narrows, and the perpendicular magnetic field includes a magnetic-field component in an oblique direction. Further, when a magnetic flux released from the main pole layer 36 returns to the recording section 30 via the magnetic recording medium 100, the magnetic flux is taken in by the trailing shield 42, and thereby expansion of the magnetic flux in the cross track direction is suppressed.

This trailing shield 42 is provided between the main pole layer 36 and the return yoke 47, and more specifically, provided to be in a range (a layer level) defined by the thickness of the auxiliary magnetic pole 40, in a region further forward than the auxiliary magnetic pole 40, as illustrated in FIG. 2, for example. Further, the trailing shield 42 is separated from the main pole layer 36 with the gap layer 41 interposed therebetween, and is formed independently of the return yoke 47. This "formed independently" means that the trailing shield 42 and the return yoke 47 are connected to each other in a state where the trailing shield 42 and the return yoke 47 are physically separated from each other.

In particular, the trailing shield 42 extends from the air bearing surface 90 toward the back, and, for example, terminates at the flare point FP. Therefore, the trailing shield 42 is adjacent to the insulating layer 43 at the back, and thus has a role to define the forefront end position (the throat-height zero position TP) of the insulating layer 43. In addition, the trailing shield 42 contains, for example, a magnetic material similar to the material of the main pole layer 36.

A planar shape of the trailing shield 42 is, for example, a rectangle having a constant width W4 greater than the width W3, as illustrated in FIG. 3.

It is to be noted that, for example, as illustrated in FIG. 1, the gap layer 41 described above is formed only at a position facing the main pole layer 36 and in proximity thereto. Therefore, the front-end portion 36A of the main pole layer 36 is separated from the trailing shield 42 with the gap layer 41 interposed therebetween, for example. In addition, the pair of side shields 38 are connected to the trailing shield 42, for example.

However, a formation range of the gap layer 41 in the cross track direction is not limited in particular. Here, the gap layer 41 is, for example, formed to overlap each of the main pole layer 36 (the front-end portion 36A) and the pair of gap layers 37, and also to overlap a part of each of the pair of side shields 38.

The thin-film coil 45 generates the recording magnetic flux. Accordingly, in the thin-film coil 45, for example, a current flows in a direction opposite to the thin-film coil 32. It is to be noted that details of the configuration of the thin-film coil 45 are similar to, for example, those of the thin-film coil 32.

The coil insulating layers 44 and 46 are formed on the auxiliary magnetic pole layer 40, and other components, and provided to separate the thin-film coil 45 electrically from its periphery. The coil insulating layer 44 is provided between the auxiliary magnetic pole layer 40 and the thin-film coil 45. The coil insulating layer 44 contains, for example, a nonmagnetic insulating material similar to the material of the coil insulating layers 34 and 35. The coil insulating layer 46 is embedded in clearance between windings of the thin-film coil 45, and provided to cover the windings. The coil insulating layer 46 contains, for example, a nonmagnetic insulating material similar to the material of the coil insulating layer 33. It is to be noted that the coil insulating layers 44 and 46 are, for example, each connected to the insulating layer 43, and a forefront end position of each of the coil insulating layers 44 and 46 is, for example, further backward than the forefront end position of the insulating layer 43.

The return yoke 47 is formed to cover the trailing shield 42, the auxiliary magnetic pole layer 40, the coil insulating layer 46, and other components. Mainly, by taking a magnetic flux supplied to the magnetic recording medium 100 into the recording section 30, the return yoke 47 circulates the magnetic flux between the recording section 30 and the magnetic recording medium 100. However, the magnetic flux supplied to the magnetic recording medium 100 may be taken in by the trailing shield 42.

This return yoke 47 extends from the air bearing surface 90 toward the back on the trailing side of the auxiliary magnetic pole layer 40 and the trailing shield 42. The return yoke 47 is connected to the trailing shield 42 at the front, and connected to the auxiliary magnetic pole 40 in the back gap 44G at the back. In addition, the return yoke 47 contains, for example, a magnetic material similar to the material of the main pole layer 36.

A planar shape of the return yoke 47 is, for example, a rectangle having the width W4, as illustrated in FIG. 3.

It is to be noted that, for example, as illustrated in FIG. 7, the dimensions of the main components of the recording section 30 on the air bearing surface 90 are as follows. The main pole layer 36 has a thickness T1. The pair of gap layers 37 (the side gap) each have a width G1. The gap layer 41 (the trailing gap) has a thickness G2. In FIG. 7, the leading shield 31, the main pole layer 36, the pair of side shields 38, and the trailing shield 42 are each shaded.

<1-1-3. Configuration of Second Head Section>

To execute the erasing process, the second head section 70 includes a main pole layer 76 that executes the erasing process, but includes no reproducing element (magnetoresistive effect element) that executes the reproducing process.

This "erasing process" is a process (a so-called preliminary erasing process) in which, before new information is recorded on a track where information is already recorded (a recorded track) among a plurality of tracks formed on a surface of the magnetic recording medium 100, the information already recorded on the recorded track is erased.

In this case, after the erasing process is executed by the second head section 70, the first head section 50 performs the recording process (a re-recording process). Accordingly, as described above, the second head section 70 includes the main pole layer 76 that executes the erasing process, and includes no reproducing element that executes the reproducing process.

As illustrated in from FIG. 1, this second head section 70 is disposed in the cross track direction (the X direction) relative to the first head section 50. In other words, the second head section 70 is disposed to be adjacent to the first head section 50 in the cross track direction. In the present embodiment, a configuration in which the second head section 70 is disposed in the cross track direction relative to the first head section 50 is referred to as "horizontal disposition type configuration".

It is to be noted that, if the second head section 70 is disposed in the cross track direction relative to the first head section 50, a positional relationship between the first head section 50 and the second head section 70 is not limited to in particular.

Among others, for example, when a case where the magnetic recording medium 100 is circular is taken as an example, the second head section 70 may be disposed on an outer circumferential side of the magnetic recording medium 100, and may be disposed on an inner circumferential side of the magnetic recording medium 100, relative to the first head section 50.

In particular, for example, when the magnetic recording-reproducing head performs the recording process from the outer circumferential side of the magnetic recording medium 100 toward the inner circumferential side, the second head section 70 may be preferably located closer to the inner circumferential side than the first head section 50. This is because, since the first head section 50 and the second head section 70 are each movable in the same direction, it is possible to perform the erasing process and the re-recording process in this order, while moving the first head section 50 and the second head section 70 in the same direction.

As a matter of course, for a similar reason, for example, when the magnetic recording-reproducing head performs the recording process from the inner circumferential side of the magnetic recording medium 100 toward the outer circumferential side, the second head section 70 may be preferably located closer to the outer circumferential side than the first head section 50.

Here, as described above, the number of the second head sections 70 is one or more. For this reason, the number of the second head sections 70 disposed in the cross track direction relative to the first head section 50 may be only one, or may be two or more. When the number of the second head sections 70 is two or more, the two or more second head sections 70 may be disposed only on the outer circumferential side of the magnetic recording medium 100, may be disposed only on the inner circumferential side of the magnetic recording medium 100, or may be disposed on both the outer circumferential side and the inner circumferential side, relative to the first head section 50.

A case where the number of the second head sections 70 is, for example, one will be described below.

This second head section 70 has, for example, a configuration substantially similar to the configuration of the recording section 30 described above. In other words, in comparison with the first head section 50, the second head section 70 includes a component corresponding to the recording section 30, but includes no component corresponding to each of the reproducing section 10 and the separation layer 20.

The second head section 70 includes no component corresponding to each of the reproducing section 10 and the separation layer 20, because the second head section 70 executes only the erasing process, without executing the reproducing process, as described above.

To be more specific, for example, as illustrated in FIG. 1, FIG. 4, and FIG. 5, the second head section 70 includes a leading shield 71, a thin-film coil 72 embedded by coil insulating layers 73 to 75, the main pole layer 76, a pair of gap layers 77, a pair of side shields 78 and an insulating layer 79, an auxiliary magnetic pole layer 80 and a gap layer 81, a trailing shield 82 and an insulating layer 83, a thin-film coil 85 embedded by coil insulating layers 84 and 86, and a return yoke 87.

The leading shield 71, the coil insulating layers 73 to 75, 84, and 86, the thin-film coils 72 and 85, the main pole layer 76, the pair of gap layers 77, the pair of side shields 78, the insulating layers 79 and 83, the auxiliary magnetic pole layer 80, the gap layer 81, the trailing shield 82, and the return yoke 87 are similar to, for example, the leading shield 31, the coil insulating layers 33 to 35, 44, and 46, the thin-film coils 32 and 45, the main pole layer 36, the pair of gap layers 37, the pair of side shields 38, the insulating layers 39 and 43, the auxiliary magnetic pole 40, the gap layer 41, the trailing shield 42, and the return yoke 47, respectively, in terms of function and configuration. Widths W5 to W8 illustrated in FIG. 5 correspond to, for example, the above-described widths W1 to W4, respectively.

Accordingly, the thin-film coil 85 generates an erasing magnetic flux. Mainly, to suppress unintentional leakage of the erasing magnetic flux generated in the thin-film coil 85 to the first head section 50, the thin-film coil 72 generates a magnetic flux for leakage suppression. The main pole layer 76 is an erasing magnetic pole layer that executes the erasing process. The main pole layer 76 generates a magnetic field for erasing, by releasing the erasing magnetic flux generated in the thin-film coil 85 toward the magnetic recording medium 100. A trailing edge E2 of the main pole layer 76 on the air bearing surface 90 has the width W5. The return yoke 87 is connected to the auxiliary magnetic pole layer 80 at a back gap 84G.

It is to be noted that, for example, as illustrated in FIG. 8, the dimensions of the main components of the second head section 70 are as follows. The main pole layer 76 has a thickness T2. The pair of gap layers 77 (a side gap) each have a width G3. The gap layer 81 (a trailing gap) has a thickness G4. In FIG. 8, the leading shield 71, the main pole layer 76, the pair of side shields 78, and the trailing shield 82 are each shaded.

Here, a relationship between the width W1 of the trailing edge E1 of the main pole layer 36 on the air bearing surface 90 and the width W5 of the trailing edge E2 of the main pole layer 76 on the air bearing surface 90 is not limited in particular. Among others, the width W5 may be preferably equal to or greater than the width W1, and more preferably greater than the width W1. This is because, in the latter case, in particular, the magnetic flux released from the main pole layer 76 is more likely to expand in the cross track direction than the magnetic flux released from the main pole layer 36 and thus, a range (the number of tracks) erasable in one erasing process increases.

In particular, when the width W5 is greater than the width W1, the width W5 may be preferably a width corresponding to a recording track width equal to or greater than a total width of two or more tracks, among the plurality of tracks formed on the surface of the magnetic recording medium 100. This is because, information already recorded on the two or more tracks is collectively erased in one erasing process, and therefore, processing efficiency of the erasing process improves. This reduces the time required for the re-recording process (a transfer speed), thereby allowing the re-recording process to be performed rapidly.

Specifically, when the width W5 is a width corresponding to a recording track width of only a width of one track, only information already recorded on one track is erased in one erasing process, and therefore, it takes a long time to perform the re-recording process. This is because it is necessary to perform the erasing process each time the re-recording process is performed. Specifically, for example, when the re-recording process is performed on two tracks, the time required for this re-recording process is the time to perform four process stages, namely, the erasing process for a first track, the re-recording process for the first track, the erasing process for a second track, and the re-recording process for the second track. Therefore, when the re-recording process is performed on two or more tracks, it is difficult to perform the re-recording process rapidly.

In contrast, when the width W5 is a width corresponding to the recording track width equal to or greater than the total width of two or more tracks, information already recorded on two or more tracks is collectively erased in one erasing process and therefore, the time required for the re-recording process is short. This is because it is not necessary to perform the erasing process each time the re-recording process is performed, and processes equivalent to the two or more erasing processes are collectively performed. Specifically, for example, when the re-recording process is performed on two tracks, the time required for this re-recording process may be the time to perform only three process stages, namely, the erasing process for first and second tracks, the re-recording process for the first track, and the re-recording process for the second track. Therefore, when the re-recording process is performed on two or more tracks, the re-recording process may be rapidly performed.

As a matter of course, the greater the width W5 is, the shorter the time to perform the re-recording process may be.

A relationship between the thickness T1 of the main pole layer 36 on the air bearing surface 90 and the thickness T2 of the main pole layer 76 on the air bearing surface 90 is not limited in particular. Among others, the thickness T2 may be preferably equal to or greater than the thickness T1, and more preferably greater than the thickness T1. This is because, in the latter case, in particular, a magnetic flux quantity released from the main pole layer 76 in the erasing process is large, with respect to a magnetic flux quantity released from the main pole layer 36 in the recording process. Therefore, of the magnetic recording medium 100, a range (the number of tracks) on which the erasing process is performed by the main pole layer 76 becomes increased, with respect to a range (the number of tracks) on which the recording process is performed by the main pole layer 36, of the magnetic recording medium 100. Accordingly, it is possible to perform re-recording on the tracks for which the erasing process is already performed, while minimizing the number of times the erasing process is performed, and maximizing the range (the number of tracks) to be erased in one erasing process.

A relationship between the width G1 of each of the pair of gap layers 37 (the side gap) attached to the main pole layer 36 on the air bearing surface 90 and the width G3 of each of the pair of gap layers 77 (the side gap) attached to the main pole layer 76 on the air bearing surface 90 is not limited in particular. Among others, the width G3 may be preferably equal to or greater than the width G1, and more preferably greater than the width G1. This is because, in the latter case, in particular, the magnetic flux released from the main pole layer 76 is more likely to expand in the cross track direction than the magnetic flux released from the main pole layer 36 and thus, a range erasable in one erasing process increases.

A relationship between the thickness G2 of the gap layer 41 (the trailing gap) attached to the main pole layer 36 on the air bearing surface 90 and the thickness G4 of the gap layer 81 (the trailing gap) attached to the main pole layer 76 on the air bearing surface 90 is not limited in particular. Among others, the thickness G4 may be preferably equal to or greater than the thickness G2, and more preferably greater than the thickness G2. This is because, in the latter case, in particular, the magnetic flux released from the main pole layer 76 is more likely to expand in the down track direction than the magnetic flux released from the main pole layer 36 and thus, a range erasable in one erasing process increases.

<1-1-4. Operation>

This magnetic recording-reproducing head operates as follows, for example.

[Recording Process]

In the recording process, when a current flows in the thin-film coil 45 of the first head section 50 (the recording section 30), a magnetic flux J for recording is generated. After being stored in the main pole layer 36 and the auxiliary magnetic pole layer 40, this magnetic flux J flows inside the main pole layer 36 toward the front-end portion 36A. At this time, at the flare point FP, the magnetic flux J is narrowed down according to a decrease in width of the main pole layer 36, and then concentrated in proximity to the trailing edge E1. The magnetic flux J concentrated in proximity to this trailing edge E1 is released from the front-end portion 36A, and thereby a magnetic field (a perpendicular magnetic field) for recording is generated. Therefore, the magnetic recording medium 100 is magnetized by the perpendicular magnetic field and thus, information is recorded on the magnetic recording medium 100.

In this case, magnetic fluxes opposite to each other in direction are generated in the thin-film coils 32 and 45, which make it difficult for the magnetic flux J to leak to the reproducing section 10. This suppresses a decrease in detection accuracy of the MR element 13 due to leakage of the magnetic flux J. This also suppresses unintentional erasing of information recorded on the magnetic recording medium 100 due to generation of an unnecessary magnetic field. This unnecessary magnetic field is generated by, for example, unintentional taking-in of the magnetic flux J by each of the lower read shield layer 11 and the upper read shield layer 14.

In particular, when the magnetic flux J is released from the front-end portion 36A, a part of the magnetic flux J is taken into the trailing shield 42, and therefore, a magnetic field gradient of the perpendicular magnetic field increases in the down track direction (on the trailing side of the front-end portion 36A). This magnetic flux J taken into the trailing shield 42 is supplied to the main pole layer 36 again via the return yoke 47.

It is to be noted that, after magnetizing the magnetic recording medium 100, the magnetic flux J released from the main pole layer 36 toward the magnetic recording medium 100 is supplied to the main pole layer 36 again via the return yoke 47. This circulates the magnetic flux J between the recording section 30 and the magnetic recording medium 100, thereby forming a magnetic circuit.

[Reproducing Process]

In the reproducing process, when a sense current flows to the MR element 13 of the first head section 50 (the reproducing section 10), a change in electric resistance of the MR element 13 occurs in response to a reproducing signal magnetic field recorded on the magnetic recording medium 100. This change in the electric resistance is detected as a change in voltage and therefore, information recorded on the magnetic recording medium 100 is reproduced.

[Erasing Process]

In this magnetic recording-reproducing head, in particular, the erasing process using the second head section 70 is also performed, in addition to the recording process and the reproducing process using the first head section 50.

Figure 9A:
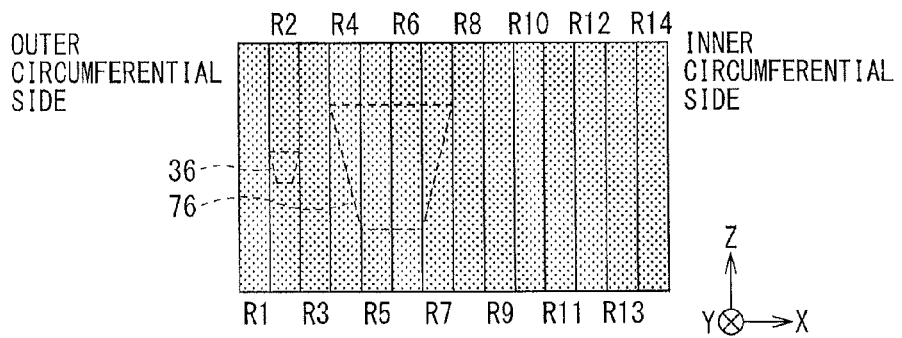
FIGS. 9A to 9C are diagrams for description of operation of the magnetic recording-reproducing head in the first embodiment of the invention.
Figure 9B:
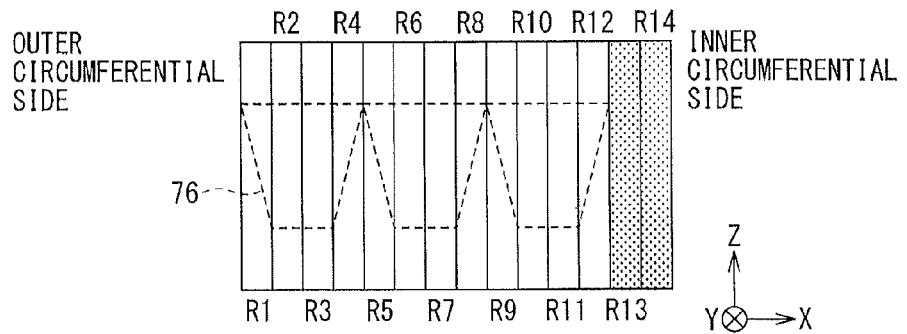
Figure 9C:
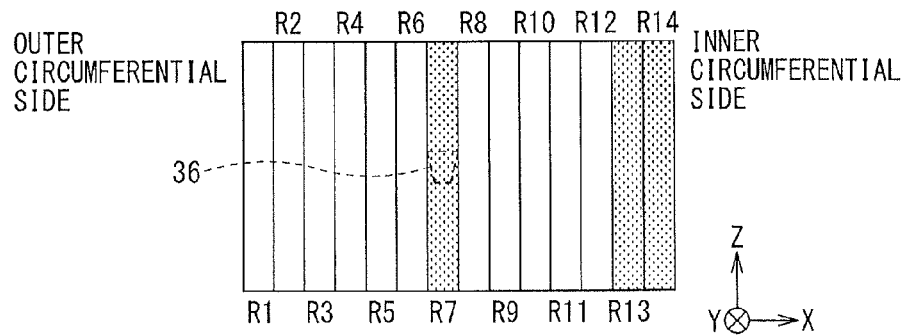

FIGS. 9A to 9C schematically illustrate a plurality of tracks (for example, fourteen tracks R1 to R14) formed on the surface (a recording surface) of the magnetic recording medium 100, for description of operation of the magnetic recording-reproducing head at the time of the erasing process. Here, for example, assume that the track R1 is located on the outer circumferential side of the magnetic recording medium 100, and the track R14 is located on the inner circumferential side of the magnetic recording medium 100.

It is to be noted that, among the plurality of tracks illustrated in each of FIGS. 9A to 9C, a shaded track indicates that information is recorded on the track, and an unshaded track indicates that information recorded on the track is erased.

Further, the main pole layers 36 and 76 each indicated by a broken line in each of FIGS. 9A to 9C represent a positional relationship between the main pole layer 36 and the magnetic recording medium 100 (the tracks R1 to R14) in the recording process, and also represent a positional relationship between the main pole layer 76 and the magnetic recording medium (the tracks R1 to R14) in the erasing process.

Here, for example, as illustrated in FIG. 6 and FIG. 9A, the following conditions are assumed. First, for example, information is already recorded on all the tracks R1 to R14, in a state before the erasing process is performed. Second, the second head section 70 is disposed on the inner circumferential side of the magnetic recording medium 100, relative to the first head section 50. Third, the widths W5 and G3 and the thicknesses T2 and G4 pertaining to the second head section 70 are greater than the widths W1 and G1 and the thicknesses T1 and G2 pertaining to the first head section 50, respectively. Fourth, the width W1 of the main pole layer 36 is a width that allows the recording process to be performed in a range (the number of tracks) corresponding to the width of one track, in one recording process. Fifth, the width W5 of the main pole layer 76 is a width that allows the erasing process to be performed in a range (the number of tracks) corresponding to the widths of four tracks, in one erasing process.

In the erasing process, when a current flows in the thin-film coil 85 of the second head section 70, an erasing magnetic flux is generated. This erasing magnetic flux is stored into the main pole layer 76 and the auxiliary magnetic pole layer 80, and thereafter flows inside the main pole layer 76 toward the front-end portion 76A. At this time, at the flare point FP, the erasing magnetic flux is narrowed down according to a decrease in width of the main pole layer 76, and then concentrated in proximity to the trailing edge E2. A magnetic field for erasing (an erasing magnetic field) is generated by release of this erasing magnetic flux concentrated in proximity to the trailing edge E2 from the front-end portion 76A. Therefore, the magnetic recording medium 100 is magnetized by the erasing magnetic field and thus, for example, as illustrated in FIG. 9B, the information recorded on the magnetic recording medium 100 is erased.

It is to be noted that FIG. 9B illustrates a case where the second head section 70 performs the erasing process three times while moving from the outer circumferential side of the magnetic recording medium 100 toward the inner circumferential side. In other words, in the first erasing process, the information recorded on the four tracks R1 to R4 is erased. In the second erasing process, the information recorded on the four tracks R5 to R8 is erased. In the third erasing process, the information recorded on the four tracks R9 to R12 is erased.

After this erasing process, the first head section 50 executes the recording process again (the re-recording process). Specifically, for example, as illustrated in FIG. 9C, in a state where the information recorded on the twelve tracks R1 to R12 is erased, the first head section 50 moves to the track R7, and thereafter the first head section 50 records information on the track R7 again by a procedure similar to the recording process described above.

It is to be noted that, here, the description is provided for the case where, for the re-recording process for the track R7, the erasing process using the second head section 70 and the re-recording process using the first head section 50 are separately performed. However, the erasing process using the second head section 70 and the re-recording process using the first head section 50 may be simultaneously performed.

For example, after the information recorded on the tracks R1 to R4 is erased using the second head section 70, information may be record again using the first head section 50 on any of the tracks R1 to R4 after the erasing, while the information recorded on the track R5 to R8 is being erased using the second head section 70.

Further, here, the description is provided for the case where, after the second head section 70 performs the erasing process three times (the tracks R1 to R12), the first head section 50 performs the re-recording process once (the track R7). However, if the re-recording process is performed on a specific track by the first head section 50 after the erasing process is performed on the specific track by the second head section 70, conditions for this erasing process are not limited in particular. Examples of the conditions include timing for performing the erasing process, the number of times the erasing process is to be performed, and the number of tracks to be subjected to erasing in one erasing process.

<1-1-5. Action and Effect>

This magnetic recording-reproducing head having the horizontal disposition type includes, on the one substrate 1, the first head section 50 having the function of executing the recording process and having the function of executing the reproducing process, and the one or more second head sections 70 each having the function of executing the erasing process and not having the function of executing the reproducing process. To be more specific, while the first head section 50 includes the main pole layer 36 that executes the recording process and including the MR element 13 that executes the reproducing process, the second head section 70 includes the main pole layer 76 that executes the erasing process and does not include the above-described MR element 13. In this case, excellent recording and reproducing characteristics are obtainable for a reason to be described below.

First, as a magnetic recording-reproducing head of a first comparative example, a magnetic recording-reproducing head including only the first head section 50 and not including the second head section 70 is conceivable. This magnetic recording-reproducing head of the first comparative example has a configuration similar to the configuration of the magnetic recording-reproducing head (FIG. 1 to FIG. 8) of the present embodiment except that the second head section 70 is not provided.

In the magnetic recording-reproducing head of the first comparative example, when information is already recorded on all tracks R1 to R14 as illustrated in FIG. 9A, to record information on the track R7 again, the track R7 is overwritten with new information. In this case, the new information is recorded on the track R7 (overwriting), while the information already recorded on the track R7 is being erased and therefore, an adverse effect due to the already recorded information is likely to occur when the new information is recorded. Specifically, since the effect due to the already recorded information occurs as noise, accuracy of recording the new information may decrease. Therefore, it is difficult to obtain sufficient recording characteristics.

In contrast, in the magnetic recording-reproducing head of the present embodiment, as illustrated in FIGS. 9A to 9C, even if the information is already recorded on the track R7, the information recorded on the track R7 is erased by the second head section 70 and thereafter, new information is recorded by the first head section 50 on the track R7 after the erasing. Therefore, an adverse effect due to the already recorded information is unlikely to occur and thus, accuracy of recording the new information is ensured. Accordingly, it is possible to obtain sufficient recording characteristics.

Further, as a magnetic recording-reproducing head of a second comparative example, a magnetic recording-reproducing head, in which not only the first head section 50 has the function of executing the reproducing process but also the second head section 70 has the function of executing the reproducing process, is conceivable. This magnetic recording-reproducing head of the second comparative example has a configuration similar to the configuration of the magnetic recording-reproducing head (FIG. 1 to FIG. 8) of the present embodiment except that the second head section 70 also includes the reproducing section 10. In the magnetic recording-reproducing head of the second comparative example, the first head section 50 is allowed to execute the reproducing process by using the MR element 13, and the second head section 70 is allowed to execute the reproducing process by using the MR element 13 as well.

However, when the reproducing process is to be executed using the plurality of (here, for example, two) MR elements 13, it is necessary to adjust positional information for each of the MR elements 13 and therefore, it is difficult to execute the reproducing process by using the two or more MR elements 13. This positional information is positional information such as a recording/reproducing offset quantity, which is necessary for causing the magnetic recording-reproducing head (the MR element 13) to perform tracking for a track to be subjected to reproducing, since a servo signal recorded on the magnetic recording medium 100 is read by the one MR element 13, in servo control of the magnetic recording-reproducing head.

It is difficult to execute the reproducing process by using the plurality of MR elements 13, because, even if the number of the MR elements 13 is two or more, it is difficult to perform the servo control for each of the plurality of MR elements 13. Therefore, after all, since it is difficult to execute the plurality of reproducing processes by using the plurality of MR elements 13, it is necessary to execute the plurality of reproducing processes by using the one MR element 13.

It is to be noted that, it is conceivable to execute the reproducing process while sequentially switching the plurality of MR elements 13 from one to another. However, a discontinuous period is generated in reproducing operation at the time of switching the plurality of MR elements 13, and therefore, the time necessary for the reproducing process increases, and the servo control becomes complicated and thus, an unexpected situation such as abnormal operation of the MR element 13 may occur. This discontinuous period is a period such as a period during which the MR element 13 after switching is forced to wait until the magnetic recording medium 100 makes one rotation, to execute the reproducing process by using the MR element 13 after the switching, at the time of switching the plurality of MR elements 13.

Besides, in general, a ferromagnetic material is used for the formation material of the MR element 13. Therefore, considering even a design pertaining to external magnetic field tolerance and thermal tolerance of the magnetic recording-reproducing head, using the plurality of MR elements 13 is not beneficial, to enable normal and stable execution of the reproducing process by the magnetic recording-reproducing head.

In this way, in the magnetic recording-reproducing head of the second comparative example in which not only the first head section 50 but also the second head section 70 have the function of executing the reproducing process, the reproducing process is difficult, in view of the servo control of the plurality of MR elements 13. Moreover, reproducing accuracy may decrease, in view of the magnetic and thermal design of the magnetic recording-reproducing head using the ferromagnetic material for the formation material of the MR element 13. Therefore, it is difficult to obtain sufficient reproducing characteristics.

In contrast, in the magnetic recording-reproducing head of the present embodiment, only the first head section 50 has the function of executing the reproducing process by using the MR element 13, and the second head section 70 does not have the function of executing the reproducing process by using the MR element 13. In this case, since the reproducing process is executed by the one MR element 13, the reproducing process is executed easily and stably, and reproducing accuracy is ensured. Therefore, sufficient reproducing characteristics are obtainable.

Accordingly, in the magnetic recording-reproducing head of the present embodiment, since the sufficient recording characteristics are obtained and the sufficient reproducing characteristics are obtained as well, excellent recording and reproducing characteristics are obtainable.

In particular, in the magnetic recording-reproducing head of the present embodiment having the horizontal disposition type configuration, the following advantages are also obtained.

The second head section 70 is disposed in the cross track direction (the X direction), relative to the first head section 50. In other words, the direction in which each of the first head section 50 and the second head section 70 moves relative to the magnetic recording medium 100 and an direction in which the first head section 50 and the second head section 70 are disposed match with each other. In this case, as apparent from the above-described operation of the erasing process, when the second head section 70 is located at the specific track at the time of the erasing process, the first head section 50 may be located at a track other than the specific track. Therefore, it is possible to perform the re-recording process on the other track (a track after being subjected to the erasing) by using the first head section 50, while performing the erasing process on the specific track by using the second head section 70 and thus, the erasing process and the re-recording process may be simultaneously performed.

Further, when the horizontal disposition type configuration is adopted, as compared with a case where a vertical disposition type configuration to be described later is adopted, a thermal design may be easier, when a component of the magnetic recording-reproducing head is intentionally brought close to the magnetic recording medium 100 by utilizing thermal expansion. It is to be noted that the vertical disposition type configuration is a configuration in which the first head section 50 and second head section 70 are disposed in the down track direction, unlike the horizontal disposition type configuration in which the first head section 50 and the second head section 70 are disposed in the cross track direction.

Specifically, when the magnetic recording-reproducing head is mounted on a magnetic recording-reproducing unit to be described later, the magnetic recording-reproducing head is used as a part of the magnetic head slider 202 (see FIG. 11 and FIG. 12). In this case, during operation of the magnetic recording-reproducing unit, when the magnetic head slider 202 inclines relative to the surface of the magnetic recording medium 100 (a magnetic disk 201 in FIG. 11), of the magnetic recording-reproducing head, a part located on the trailing side approaches the magnetic recording medium 100 relatively easily, and a part located on the leading side moves away from the magnetic recording medium 100 relatively easily. In other words, due to the inclination of the magnetic head slider 202, the distance between the magnetic recording-reproducing head and the magnetic recording medium 100 changes in the down track direction.

Accordingly, since the vertical disposition type configuration is adopted, when, for example, the second head section 70 is disposed closer to the trailing side than the first head section 50, the second head section 70 easily approaches the magnetic recording medium 100, whereas the first head section 50 less easily approaches the magnetic recording medium 100, due to the above-described inclination of the magnetic head slider 202.

Assume that, in such a situation, the first head section 50 (for example, the main pole layer 36) is brought close to the magnetic recording medium 100 by utilizing thermal expansion in the recording process by using a heating source such as a heater, and the second head section 70 (for example, the main pole layer 76) is brought close to the magnetic recording medium 100 by utilizing thermal expansion in the erasing process by similarly using a heating source such as a heater. In this case, to optimize the distance between the first head section 50 and the magnetic recording medium 100 at the time of thermal expansion, and to optimize the distance between the second head section 70 and the magnetic recording medium 100 at the time of thermal expansion, it is necessary to design a thermal expansion quantity, a heat quantity necessary therefor, and other factors, for each of the first head section 50 and the second head section 70, separately. Therefore, the design is complicated.

In contrast, when the horizontal disposition type configuration is adopted, it is not necessary to consider an influence due to the above-described inclination of the magnetic head slider 202, even if the distance between the magnetic recording-reproducing head and the magnetic recording medium 100 changes in the down track direction. In this case, to optimize the distance between the first head section 50 and the magnetic recording medium 100 at the time of thermal expansion, and to optimize the distance between the second head section 70 and the magnetic recording medium 100 at the time of thermal expansion, a thermal expansion quantity, a heat quantity necessary therefor, and any other factor may be commonly designed for each of the first head section 50 and the second head section 70. Therefore, the design is easy. Besides, since it is not necessary to consider an influence due to the above-described inclination of the magnetic head slider 202, an incident such as an intentional collision between the magnetic recording-reproducing head and the magnetic recording medium 100 is less likely to occur. Accordingly, it is also possible to improve the life of the magnetic recording-reproducing head, and any other characteristic.

Further, when the horizontal disposition type configuration is adopted, as illustrated in FIG. 1, when the series of components are sequentially formed on the substrate 1 in a process of manufacturing the magnetic recording-reproducing head, the recording section 30 of the first head section 50 and the second head section 70 may be formed in parallel. This is because the configuration (the types and the number of components) of the first head section 50 and the configuration of the second head section 70 are substantially common. Therefore, when the second head section 70 is attached to the first head section 50, the number of manufacturing processes does not considerably increase and thus, the magnetic recording-reproducing head including the first head section 50 and the second head section 70 may be easily manufactured.

In addition, in the magnetic recording-reproducing head of the present embodiment, if the width W5 of the trailing edge of the main pole layer 76 is greater than the width W1 of the trailing edge of the main pole layer 36, the range (the number of tracks) erasable in one erasing process increases and thus, it is possible to obtain a higher effect. This effect is also obtained, when the thickness T2 of the main pole layer 76 is greater than the thickness T1 of the main pole layer 36, when the width G3 of each of the pair of gap layers 77 is greater than the width G1 of each of the pair of gap layers 37, and when the thickness G4 of the gap layer 81 is greater than the thickness G2 of the gap layer 41.

Further, if the width W5 of the main pole layer 76 is a width corresponding to the recording track width equal to or greater than the total width of two or more tracks, the processing efficiency of the erasing process improves and therefore, a higher effect is obtainable.

1-2. SECOND EMBODIMENT

Vertical Disposition Type Configuration

A magnetic recording-reproducing head of a second embodiment has the vertical disposition type configuration, unlike the above-described magnetic recording-reproducing head of the first embodiment having the horizontal disposition type configuration.

Figure 10:
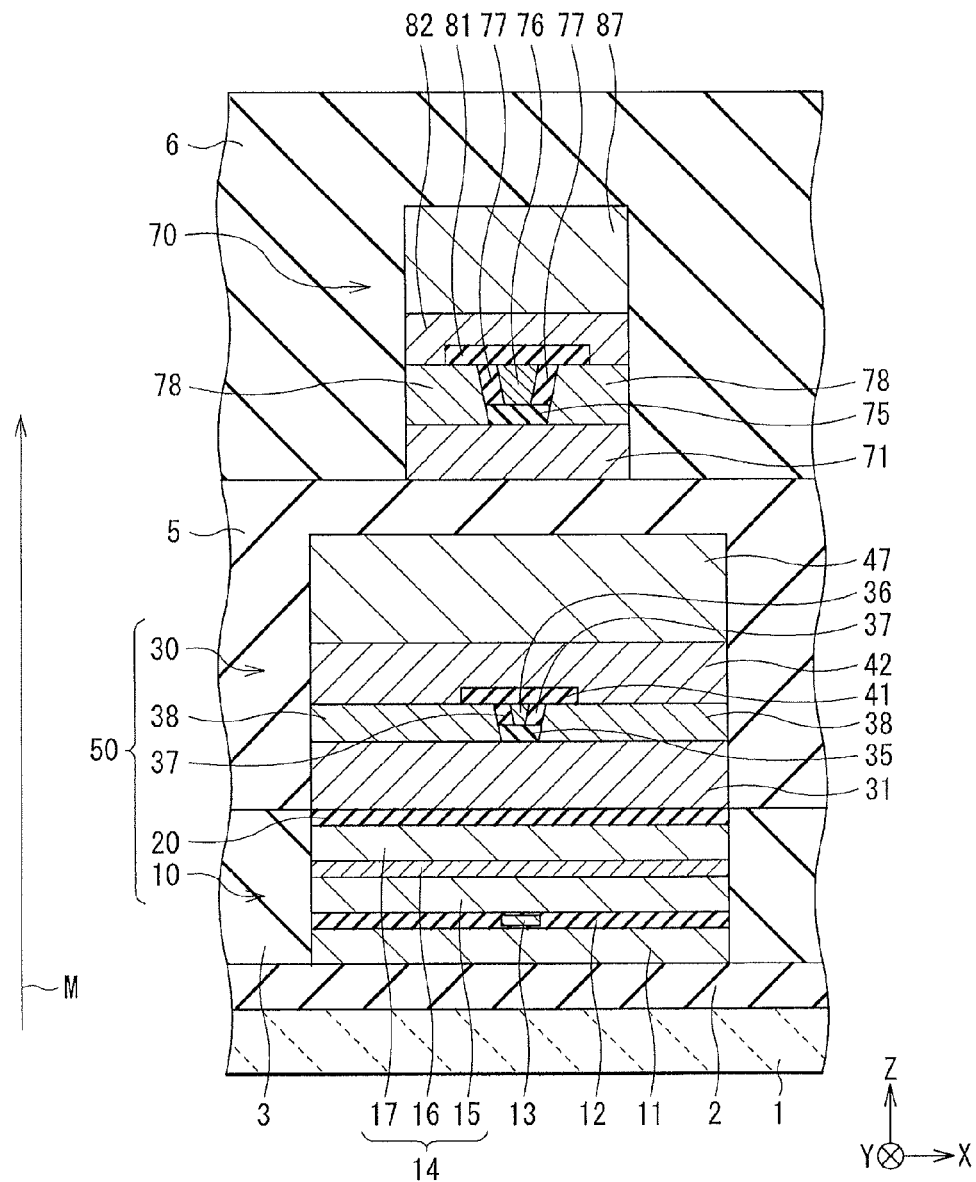
FIG. 10 is a cross-sectional diagram illustrating a configuration (an XZ cross section) of a magnetic recording-reproducing head in a second embodiment of the invention.

FIG. 10 illustrates a cross-sectional configuration (an XZ cross section) of the magnetic recording-reproducing head in the second embodiment of the invention, and corresponds to FIG. 1.

As illustrated in FIG. 10, the magnetic recording-reproducing head of the present embodiment has a configuration substantially similar to the configuration of the magnetic recording-reproducing head of the first embodiment, except that the second head section 70 is disposed in a down track direction (a Y direction) relative to the first head section 50. In the present embodiment, the configuration in which the second head section 70 is disposed to be adjacent to the first head section 50 in the down track direction is referred to as "vertical disposition type configuration". In other words, the vertical disposition type configuration is a configuration in which the first head section 50 and the second head section 70 are disposed in the down track direction, unlike the horizontal disposition type configuration in which the first head section 50 and the second head section 70 are disposed in the cross track direction.

It is to be noted that, in the following, points already described in the first embodiment will be omitted whenever necessary.

<1-2-1. Configuration>

The magnetic recording-reproducing head includes, for example, as illustrated in FIG. 10, the insulating layer 2, the first head section 50, an insulating layer 5, the one or more second head sections 70, and an overcoat layer 6, on the substrate 1. In other words, the magnetic recording-reproducing head having the vertical disposition type configuration has, for example, the configuration similar to the configuration of the magnetic recording-reproducing head having the horizontal disposition type configuration, except that the second head section 70 is disposed in the down track direction relative to the first head section 50, and the insulating layer 5 and the overcoat layer 6 are provided in place of the insulating layer 3 and the overcoat layer 4.

Details of each of the substrate 1, the insulating layer 2, the first head section 50, and the second head section 70 are similar to those described in the first embodiment. However, the second head section 70 is formed on the insulating layer 5.

The insulating layer 5 covers the first head section 50 (the recording section 30), and contains, for example, a nonmagnetic insulating material similar to the material of the insulating layer 3.

The overcoat layer 6 covers the second head section 70, and contains, for example, a nonmagnetic insulating material similar to the material of the insulating layer 3.

It is to be noted that, if the second head section 70 is disposed in the down track direction relative to the first head section 50, a positional relationship between the first head section 50 and the second head section 70 is not limited in particular.

Specifically, for example, the second head section 70 may be disposed on the trailing side of the first head section 50, or may be disposed on the leading side of the first head section 50.

Further, since the number of the second head sections 70 is one or more, the number of the second head sections 70 disposed in the down track direction relative to the first head section 50 may be only one, or may be two or more. When the number of the second head sections 70 is two or more, these two or more second head sections 70 may be disposed only on the railing side, may be disposed only on the leading side, or may be disposed on both the railing side and the leading side, relative to the first head section 50.

Here, for example, a case where the number of the second head sections 70 is one will be described.

<1-2-2. Operation>

This magnetic recording-reproducing head performs, for example, a recording process, a reproducing process, and an erasing process by a procedure similar to the procedure of the magnetic recording-reproducing head of the first embodiment, except for operation to be described below.

Figure 11A:
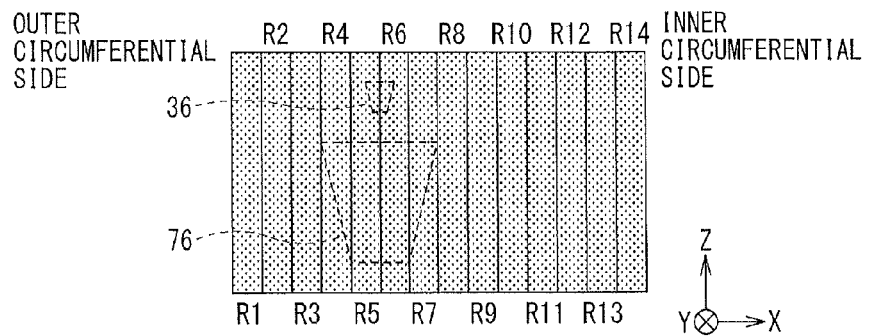
FIGS. 11A to 11C are diagrams for description of operation of the magnetic recording-reproducing head in the second embodiment of the invention.
Figure 11B:
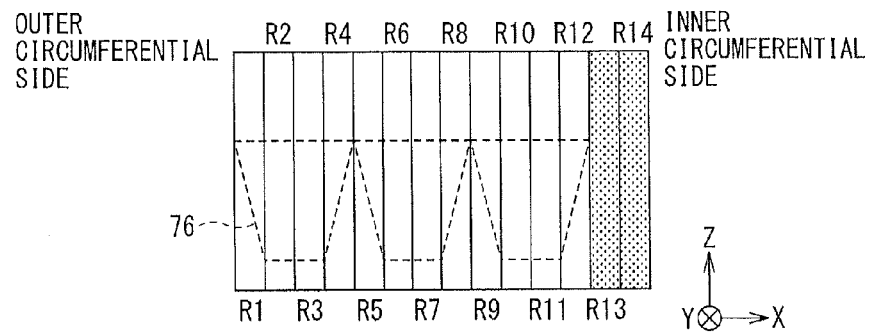
Figure 11C:
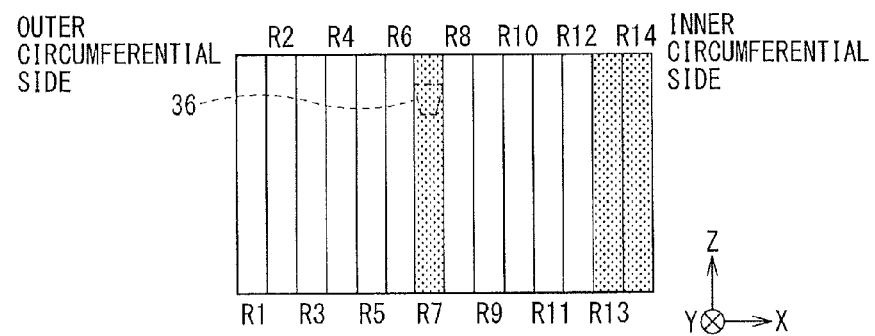

FIGS. 11A to 11C illustrate a plurality of tracks (tracks R1 to R14) corresponding to FIGS. 9A to 9C, for description of operation at the time of the erasing process of the magnetic recording-reproducing head.

In a state where information is already recorded on all of the tracks R1 to R14 as illustrated in FIG. 11A, the second head section 70 performs the erasing process three times while moving toward the inner circumferential side of the magnetic recording medium 100, and therefore, the information recorded on the tracks R1 to R12 is erased in the erasing process, as illustrated in FIG. 11B, for example.

After this erasing process, the first head section 50 performs the re-recording process. Specifically, for example, as illustrated in FIG. 11C, the first head section 50 moves to the track R7 and thereafter, the first head section 50 records information again on the track R7.

It is to be noted that, in the present embodiment, the erasing process using the second head section 70 and the re-recording process using the first head section 50 are separately performed on the track R7, unlike the first embodiment. In other words, simultaneously performing the erasing process using the second head section 70 and the re-recording process using the first head section 50 is not allowed. This is because, in the present embodiment, unlike the first embodiment in which the first head section 50 (the main pole layer 36) and the second head section 70 (the main pole layer 76) may be positioned on the respective tracks different from each other, it is necessary to position the first head section 50 (a main pole layer 36) and the second head section 70 (a main pole layer 76) on the same track.

However, as with the first embodiment, conditions for the erasing process are not limited in particular.

<1-2-3. Action and Effect>

This magnetic recording-reproducing head having the vertical disposition type configuration includes the first head section 50 and the one or more second head sections 70 on the one substrate 1, as with the above-described magnetic recording-reproducing head having the horizontal disposition type configuration. Therefore, for the reason described in the first embodiment, it is possible to obtain excellent recording and reproducing characteristics.

Except for this, actions and effects are similar to those of the first embodiment.

1-3. MODIFICATIONS

The configuration of the magnetic recording-reproducing head of the invention is modifiable as appropriate.

First Modification

Specifically, in the magnetic recording-reproducing head having the horizontal disposition type configuration (the first embodiment), the case where the number of the second head sections 70 is one is described, but as described above, the number of the second head sections 70 may be two or more. In this case, the one first head section 50 and the two or more second head sections 70 are disposed in the cross track direction.

Further, in the magnetic recording-reproducing head having the vertical disposition type configuration (the second embodiment), the case where the number of the second head sections 70 is one is described, but as described above, the number of the second head sections 70 may be two or more. In this case, the one first head section 50 and the two or more second head sections 70 are disposed in the down track direction.

In these cases as well, similar effects are obtainable. In particular, if the number of the second head sections 70 is two or more, the range (the number of tracks) erasable in the erasing process increases, and it is possible to perform the erasing process in the wide range without frequently moving the magnetic head slider 202 (see FIG. 12) equipped with the magnetic recording-reproducing head. Therefore, a higher effect is obtainable.

Second Modification

The configuration of the magnetic recording-reproducing head having the horizontal disposition type configuration (the first embodiment) and the configuration of the magnetic recording-reproducing head having the vertical disposition type configuration (the second embodiment) may be combined. In this case, the one first head section 50 and the one or more second head sections 70 are disposed in the cross track direction, and the one first head section 50 and the one or more second head sections 70 are disposed in the down track direction. In this case as well, similar effects are obtainable.

Third Modification

In the first embodiment pertaining to the horizontal disposition type configuration, the first head section 50 and the second head section 70 are disposed in the cross track direction, and in the second embodiment pertaining to the vertical disposition type configuration, the first head section 50 and the second head section 70 are disposed in the down track direction. However, if the magnetic recording-reproducing head includes the first head section 50 and the second head section 70, the position of the second head section 70 relative to the first head section 50 is not limited in particular.

Here, although not specifically illustrated, for example, with reference to FIG. 1, the position of the second head section 70 may be vertically (the trailing side or leading side) displaced relative to the position of the first head section 50. Similarly, although not specifically illustrated, for example, with reference to FIG. 10, the position of the second head section 70 may be laterally displaced relative to the position of the first head section 50.

In this case as well, similar effects are obtainable. However, it may be preferable to adopt the horizontal disposition type configuration or the vertical disposition type configuration, considering easy formation of each of the first head section 50 and the second head section 70.

Fourth Modification

In the first embodiment pertaining to the horizontal disposition type configuration and the second embodiment pertaining to the vertical disposition type configuration, the width W5 of the main pole layer 76 is equal to or greater than the width W1 of the main pole layer 36, but the width W5 may be less than the width W1. In this case as well, similar effects are obtainable. However, in one erasing process, to perform the erasing process in a greater range (number of tracks), the width W5 may be preferably equal to or greater than the width W1, and more preferably greater than the width W1.

Fifth Modification

The recording method by the recording section 30 including the first head section 50 may be a typical recording scheme that avoids overlapping regions (tracks) where the recording process is performed, or may be a shingled recording scheme that overlaps the regions where the recording process is performed.

Among others, the recording method of the recording section 30 may be preferably the shingled recording scheme. This is because it is possible to record information at a high density by using the first head section 50, while performing the erasing process in a wider range by using the second head section 70 and therefore, a higher effect is obtained.

In particular, when the shingled recording scheme is used, it is necessary to perform the erasing process in a greater range (number of tracks) before performing the re-recording process and therefore, it is possible to perform the erasing process and the re-recording process more efficiently.

Sixth Modification

In the first embodiment pertaining to the horizontal disposition type configuration and the second embodiment pertaining to the vertical disposition type configuration, as described above, if the second head section 70 does not have the function of executing the reproducing process while the first head section 50 has the function of executing the reproducing process, the second head section 70 may include the reproducing section 10. In this case, the second head section 70 includes, for example, a part corresponding to the reproducing section 10 of the first head section 50, the separation layer 20, and a part corresponding to the recording section 30 of the first head section 50.

However, for example, wiring for carrying current or any other wiring is connected to the MR element 13 included in the first head section 50 and therefore, the MR element 13 is substantially allowed to execute the reproducing process. In contrast, for example, wiring for carrying current or any other wiring is not connected to the MR element 13 included in the second head section 70 and therefore, this MR element 13 is not substantially allowed to execute the reproducing process. As a matter of course, using a method other than the presence/absence of the connection of the wiring, the MR element 13 included in the first head section 50 may be substantially allowed to execute the reproducing process, and the MR element 13 included in the second head section 70 may not be substantially allowed to execute the reproducing process.

In other words, in the sixth modification described here, when the reproducing section 10 (the MR element 13) is not substantially allowed to execute the reproducing process as described above even if the second head section 70 includes the reproducing section 10, the second head section 70 is interpreted (defined) as a section not having the function of executing the reproducing process. For this reason, in the definition, the second head section 70, in which the MR element 13 is not substantially allowed to execute the reproducing process even if the second head section 70 includes the reproducing section 10, is, basically, synonymous with the second head section 70 not including the reproducing section 10. Therefore, similar effects are obtainable, even if the second head section 70 formally includes the reproducing section 10.

In particular, in the first embodiment pertaining to the horizontal disposition type configuration, as may be assumed from FIG. 1, when the first head section 50 and the second head section 70 both include the respective reproducing sections 10, it is possible to form the respective reproducing sections 10 in parallel. In this case, at the time when the separation layer 20 is formed on both of the reproducing sections 10 after both of the reproducing sections 10 are formed, a height of a base layer in a formation region of the first head section 50 (a distance from the surface of the substrate 1 to the surface of the separation layer 20) and a height of the base layer in a formation region of the second head section 70 become substantially equal. Therefore, the entire base layer becomes flat. Accordingly, the recording section 30 may be easily formed in the formation region of the first head section 50, and a part corresponding to the recording section 30 may be easily formed in the formation region of the second head section 70.

<2. Magnetic Recording-Reproducing Unit>

Next, the magnetic recording-reproducing unit equipped with the above-described magnetic recording-reproducing head will be described.

Figure 12:
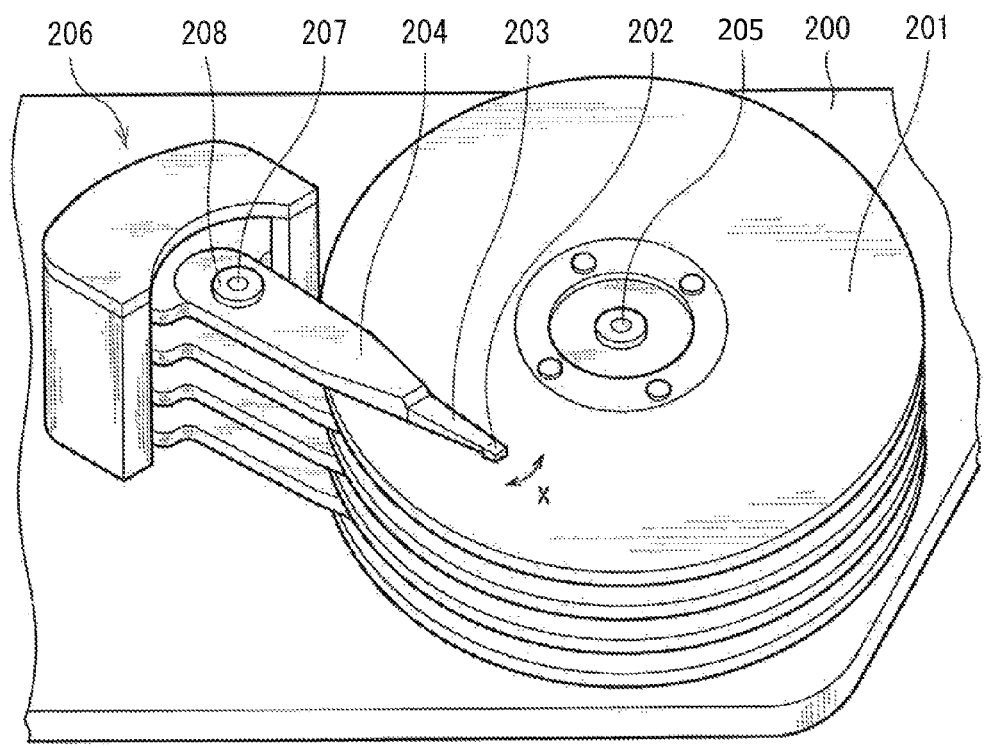
FIG. 12 is a perspective view illustrating a configuration of a magnetic recording-reproducing unit equipped with the magnetic recording-reproducing head.
Figure 13:
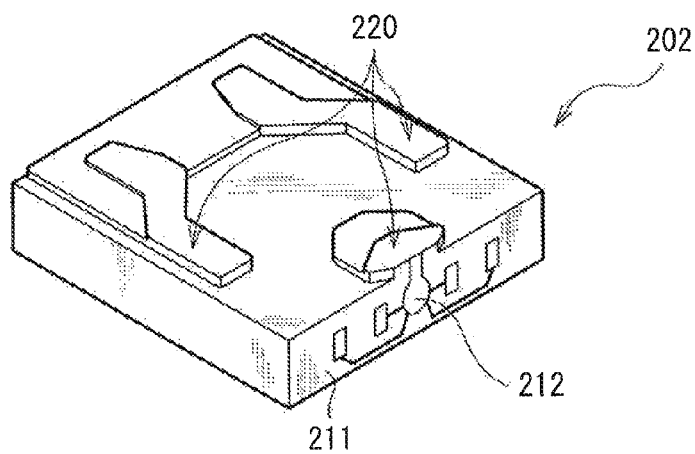
FIG. 13 is a perspective view illustrating an enlarged configuration of a main part of the magnetic recording-reproducing unit.

FIG. 12 illustrates a perspective configuration of the magnetic recording-reproducing unit. FIG. 13 illustrates an enlarged perspective configuration of a main part of the magnetic recording-reproducing unit illustrated in FIG. 12.

The magnetic recording-reproducing unit described here is, for example, a hard disk drive. For example, as illustrated in FIG. 12, this magnetic recording-reproducing unit includes, in a housing 200, a plurality of magnetic disks (hard disks) 201 each corresponding to the magnetic recording medium 100 (FIG. 6), a plurality of suspensions 203 disposed to correspond to the respective magnetic disks 201 and each supporting the magnetic head slider 202, and a plurality of arms 204 that support the respective suspensions 203.

The magnetic disks 201 are each rotatable about a spindle motor 205 fixed to the housing 200. The arms 204 are connected to a drive section 206 serving as a power source, and are each pivotable about a fixed shaft 207 fixed to the housing 200 with a bearing 208 interposed therebetween. The drive section 206 includes, for example, a driving source such as a voice coil motor. This magnetic recording-reproducing unit is, for example, a model in which the plurality of arms 204 are integrally pivotable about the fixed shaft 207. It is to be noted that, in FIG. 12, the housing 200 is partially cut away to allow easy viewing of an inner configuration of the magnetic recording-reproducing unit.

The magnetic head slider 202 includes, for example, a substrate 211, and a magnetic recording-reproducing head 212 attached to one surface of the substrate 211 as illustrated in FIG. 13. The substrate 211 contains, for example, a nonmagnetic insulating material such as the AlTiC, and has a substantially rectangular parallelepiped shape. The magnetic recording-reproducing head 212 has a configuration similar to the configuration of the above-described magnetic recording-reproducing head of the invention. One surface (an air bearing surface 220) of the substrate 211 has, for example, an uneven configuration to decrease air resistance that occurs when the arms 204 pivot, and the magnetic recording-reproducing head 212 is attached to another surface (another surface orthogonal to the air bearing surface 220, specifically, a surface on a right front side in FIG. 13) of the substrate 211. When the magnetic disk 201 rotates at the time of the recording process, the reproducing process, the erasing process, or any other process, the magnetic head slider 202 floats from the recording surface of the magnetic disk 201, by utilizing an air flow generated between the recording surface (the surface facing the magnetic head slider 202) of the magnetic disk 201 and the air bearing surface 220. It is to be noted that, FIG. 13 illustrates a vertically inverted state of the state illustrated in FIG. 12, for easy viewing of a configuration of the magnetic head slider 202 on the air bearing surface 220 side.

In this magnetic recording-reproducing unit, the arm 204 pivots to move the magnetic head slider 202 to a predetermined region (a recording region) of the magnetic disk 201. Subsequently, when the magnetic recording-reproducing head 212 is energized in a state of facing the magnetic disk 201, the magnetic recording-reproducing head 212 performs the recording process, the reproducing process, or the erasing process, based on the above-described operation principle.

In this magnetic recording-reproducing unit, the magnetic recording-reproducing head 212 having a configuration similar to the configuration of the above-described magnetic recording reproducing head is mounted and therefore, excellent recording and reproducing characteristics are obtainable.

EXAMPLE

Next, Example of the invention will be described in detail. It is to be noted that the description will be provided in the following order.
1. SN Ratio
2. Correlation between Linear Recording Density and SN Ratio in Erasing Process

1. SN Ratio

Experimental Examples 1 to 4

First, an SN ratio (dB) was examined (Experimental Examples 1 to 3), using the magnetic recording-reproducing head having the horizontal disposition type configuration of the invention (the first embodiment), namely, a simulation modeled on the magnetic recording-reproducing head in which the first head section 50 and the second head section 70 are disposed in the cross track direction. In this case, in a state of information being already recorded on a specific track, the re-recording process (linear recording density=893 kfci) was performed on the track after the erasing process was performed on the track.

In addition, for a comparison, an SN ratio (dB) was examined (Experimental Example 4), using a simulation modeled on the magnetic recording-reproducing head of the comparative example including only the first head section 50 and not including the second head section 70. In this case, in a state of information being already recorded on a specific track, the re-recording process (linear recording density=893 kfci) was performed on the track without performing the erasing process.

Results of examining the SN ratios are as listed in Table 1.

In this simulation, conditions were set as follows. The formation material of each of the main pole layer 36 and the main pole layer 76 was iron cobalt alloy (FeCo), and the recording method of the re-recording process was the shingled recording scheme. The width W1 of the trailing edge E1 of the main pole layer 36 was 60 nm, the thickness T1 of the main pole layer 36 was 70 nm, the width G1 of each of the pair of gap layers 37 was 50 nm, and the thickness G2 of the gap layer 41 was 20 nm. The width W5 of the trailing edge of the main pole layer 76 was 250 nm, the thickness T2 of the main pole layer 76 was 300 nm, the width G3 of each of the pair of gap layers 77 was 80 nm, and the thickness G4 of the gap layer 81 was 30 nm. In performing the erasing process, a DC signal, an AC signal, and a recording signal (linear recording density=750 kfci) were each used as a signal (an erasing signal) to perform the erasing process.

It is to be noted that, when the re-recording process was performed using the magnetic recording-reproducing head of the comparative example, the re-recording (overwriting) process (high linear recording density=893 kfci) was assumed to be performed after the recording process (low linear recording density=300 kfci) was performed.

TABLE 1

| Experimental Example | Erasing Process | Erasing Signal | SN Ratio (dB) |
|---|---|---|---|
| 1 | Performed | DC | 21.4 |
| 2 | Performed | AC | 19.9 |
| 3 | Performed | 750 kfci | 19.0 |
| 4 | Not performed | — | 18.2 |

As listed in Table 1, in the case where the erasing process was performed (Experimental Examples 1 to 3), the SN ratio greatly increased, as compared with the case where the erasing process was not performed (Experimental Example 4).

<2. Correlation Between Linear Recording Density and SN Ratio in Erasing Process>

Figure 14:
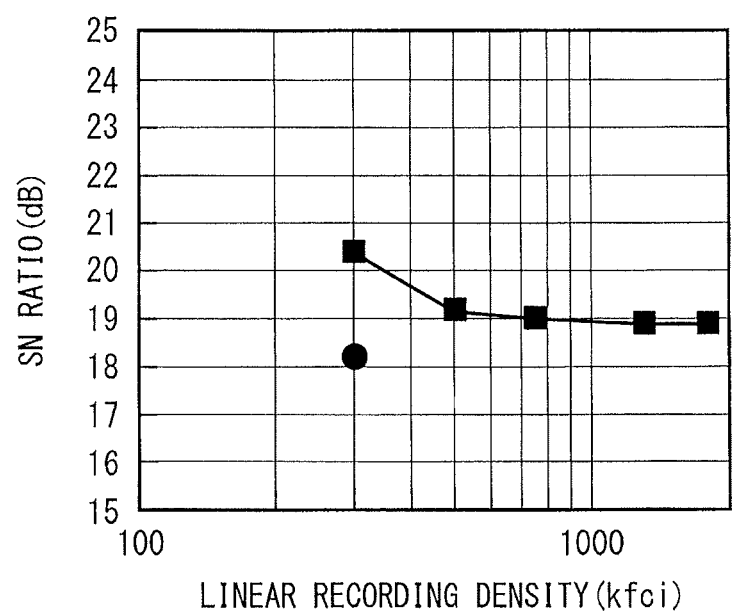
FIG. 14 is a diagram illustrating a correlation between a linear recording density and an SN ratio in an erasing process.

Next, in a case where the erasing process and the re-recording process were performed in this order by using the magnetic recording-reproducing head of the invention (linear recording density=893 kfci), a correlation between a condition (linear recording density of recording signal: kfci) for the erasing process and an SN ratio was examined, and a result illustrated in FIG. 14 was obtained. In this case, the linear recording density in the erasing process was changed in five stages (300 kfci, 500 kfci, 750 kfci, 1300 kfci, and 1800 kfci).

In FIG. 14, a black square (■) represents the SN ratio pertaining to the magnetic recording-reproducing head of the invention, and a black circle (•) represents the SN ratio (=18.2 dB) for the magnetic recording-reproducing head of the comparative example.

As illustrated in FIG. 14, in the magnetic recording-reproducing head of the invention, after the SN ratio gradually decreased as the linear recording density in the erasing process increased, the SN ratio became substantially uniform (=18.9 dB). However, a minimum (=18.9 dB) of the SN ratio pertaining to the magnetic recording-reproducing head of the invention was still higher than the SN ratio (=18.2 dB) pertaining to the magnetic recording-reproducing head of the comparative example.

This result indicates that in a case where the erasing process is performed, the SN ratio improves without depending on the linear recording density in the erasing process, as compared with a case where the erasing process is not performed.

It is to be noted that, in the magnetic recording-reproducing head of the invention, the SN ratio exhibited a tendency to become a maximum (=20.4 dB) at the low linear recording density (=300 kfci), and to decrease gradually as the linear recording density increases. This tendency is expected to be obtained for the magnetic recording-reproducing head of the comparative example likewise. For this reason, in the magnetic recording-reproducing head of the comparative example, the SN ratio is expected to become a maximum (=18.2 dB) at the low linear recording density (=300 kfci), and to decrease gradually as the linear recording density increases. Based on this expectation, in the magnetic recording-reproducing head of the comparative example, even if the linear recording density is changed, the SN ratio is expected not to exceed the above-described maximum (=18.2 dB). Therefore, the SN ratio pertaining to the magnetic recording-reproducing head of the comparative example is expected not to reach the SN ratio pertaining to the magnetic recording-reproducing head of the invention, even if the linear recording density in the erasing process is changed in the magnetic recording-reproducing head of the invention.

Accordingly, the SN ratio was improved by using the magnetic recording-reproducing head that included the first head section 50 having the function of executing the recording process and having the function of executing the reproducing process, and the second head section 70 having the function of executing the erasing process and not having the function of executing the reproducing process.

With reference to some embodiments, an aspect of the invention has been described above. However, the aspect of the invention is not limited to the aspect described in the above-described embodiments, and the aspect of the invention may be variously modifiable.

What is claimed is:

1. A magnetic recording-reproducing head comprising, on a support member:
   a first head section having a function of executing a recording process and having a function of executing a reproducing process; and
   one or more second head sections each having a function of executing an erasing process and having no function of executing a reproducing process, wherein
   the first head section includes a recording magnetic pole layer that executes the recording process, and includes a magneto-resistive effect element that executes the reproducing process,
   the one or more second head sections each include an erasing magnetic pole layer that executes the erasing process, and include no magneto-resistive effect element that executes the reproducing process, and
   a width of a trailing edge of the erasing magnetic pole layer on an air bearing surface is greater than a width of a trailing edge of the recording magnetic pole layer on the air bearing surface.

2. The magnetic recording-reproducing head according to claim 1, wherein one or more of the one or more second head sections is disposed in a recording track width direction, relative to the first head section.

3. The magnetic recording-reproducing head according to claim 1, wherein one or more of the one or more second head sections is disposed in a direction intersecting a recording track width direction, relative to the first head section.

4. The magnetic recording-reproducing head according to claim 1, wherein a thickness of the erasing magnetic pole layer on an air bearing surface is greater than a thickness of the recording magnetic pole layer on the air bearing surface.

5. The magnetic recording-reproducing head according to claim 1, wherein a width of a side gap between a side shield of the second head section and the erasing magnetic pole layer on an air bearing surface is greater than a width of a side gap between a side shield of the first head section and the recording magnetic pole layer on the air bearing surface.

6. The magnetic recording-reproducing head according to claim 1, wherein a width of a trailing gap between a trailing shield of the second head section and the erasing magnetic pole layer on an air bearing surface is greater than a width of a trailing gap between a trailing shield of the first head section and the recording magnetic pole layer on the air bearing surface.

7. The magnetic recording-reproducing head according to claim 1, wherein a width of a trailing edge of the erasing magnetic pole layer on an air bearing surface is a width corresponding to a recording track width equal to or greater than a total width of two or more tracks.

8. The magnetic recording-reproducing head according to claim 1, wherein the first head section executes a recording process employing a shingled recording scheme.

9. A magnetic recording-reproducing unit provided with a magnetic recording medium, and a magnetic recording-reproducing head, the magnetic recording-reproducing head comprising, on a support member:
   a first head section having a function of executing a recording process and having a function of executing a reproducing process; and
   one or more second head sections each having a function of executing an erasing process and having no function of executing a reproducing process,
   wherein
   the first head section includes a recording magnetic pole layer that executes the recording process, and includes a magneto-resistive effect element that executes the reproducing process,
   the one or more second head sections each include an erasing magnetic pole layer that executes the erasing process, and include no magneto-resistive effect element that executes the reproducing process,
   a width of a trailing edge of the erasing magnetic pole layer on an air hearing surface is greater than a width of a trailing edge of the recording magnetic pole layer on the air bearing surface.

* * * * *